United States Patent
Van Antwerpen et al.

(10) Patent No.: US 10,169,618 B2
(45) Date of Patent: Jan. 1, 2019

(54) ENCRYPTION METHOD FOR EXECUTE-IN-PLACE MEMORIES

(71) Applicant: Cypress Semiconductor Corporation, San Jose, CA (US)

(72) Inventors: Hans Van Antwerpen, Mountain View, CA (US); Jan-Willem van de Waerdt, San Jose, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 14/580,753

(22) Filed: Dec. 23, 2014

(65) Prior Publication Data

US 2015/0371063 A1 Dec. 24, 2015

Related U.S. Application Data

(60) Provisional application No. 62/014,860, filed on Jun. 20, 2014.

(51) Int. Cl.
| | | |
|---|---|---|
| *G06F 21/80* | (2013.01) | |
| *G06F 12/14* | (2006.01) | |
| *G06F 9/445* | (2018.01) | |
| *G06F 21/79* | (2013.01) | |
| *G09C 1/00* | (2006.01) | |
| *H04L 9/06* | (2006.01) | |

(52) U.S. Cl.
CPC .......... *G06F 21/80* (2013.01); *G06F 9/44573* (2013.01); *G06F 12/1408* (2013.01); *G06F 21/79* (2013.01); *G09C 1/00* (2013.01); *H04L 9/0637* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 5,812,671 | A | 9/1998 | Ross, Jr. |
| 5,825,878 | A | 10/1998 | Takahashi et al. |
| 5,995,628 | A | 11/1999 | Kitaj et al. |
| 6,272,637 | B1 * | 8/2001 | Little .................. G06F 12/1408 380/52 |
| 6,330,185 | B1 | 12/2001 | Wong et al. |

(Continued)

FOREIGN PATENT DOCUMENTS

| | | |
|---|---|---|
| CN | 1836220 A | 9/2006 |
| CN | 202870835 U | 4/2013 |

(Continued)

OTHER PUBLICATIONS

Microsoft Computer Dictionary, $5^{th}$ Edition, Microsoft Press, ISBN 10:07359-1495-4, May 2002.*

(Continued)

*Primary Examiner* — Piotr Poltorak

(57) ABSTRACT

Encryption/decryption techniques for external memory are described herein. In an example embodiment, a device comprises an internal memory and an external memory controller. The internal memory is configured to store a key. The external memory controller is configured to encrypt, with the key, an address for an access operation to an external memory device to obtain an encrypted address, and to encrypt or decrypt a block of data for the access operation based on the encrypted address.

13 Claims, 8 Drawing Sheets

(56) References Cited

U.S. PATENT DOCUMENTS

| | | | |
|---|---|---|---|
| 6,523,118 B1 | 2/2003 | Buer | |
| 6,938,162 B1* | 8/2005 | Nagai et al. | 713/189 |
| 7,386,717 B2 | 6/2008 | Adusumilli | |
| 7,395,165 B2* | 7/2008 | Buhr | G06F 21/79 |
| | | | 702/108 |
| 8,170,205 B2* | 5/2012 | Takeda | 380/37 |
| 8,370,641 B2 | 2/2013 | Henry et al. | |
| 8,549,367 B1* | 10/2013 | Sherred | 714/718 |
| 8,555,082 B1 | 10/2013 | Bibikar et al. | |
| 8,726,037 B2* | 5/2014 | Pean et al. | 713/189 |
| 8,762,739 B2 | 6/2014 | Plainecassagne et al. | |
| 9,847,872 B2 | 12/2017 | Durham et al. | |
| 2002/0073367 A1 | 6/2002 | Hartmann | |
| 2002/0166058 A1 | 11/2002 | Fueki | |
| 2003/0200454 A1 | 10/2003 | Foster et al. | |
| 2004/0015707 A1* | 1/2004 | Lee | G06F 12/1408 |
| | | | 713/189 |
| 2006/0010328 A1* | 1/2006 | Esaka | G06F 21/79 |
| | | | 713/190 |
| 2006/0031687 A1 | 2/2006 | Su et al. | |
| 2006/0059369 A1 | 3/2006 | Fayad et al. | |
| 2006/0064593 A1* | 3/2006 | Dobranski | 713/176 |
| 2006/0119384 A1 | 6/2006 | Camarota et al. | |
| 2006/0269063 A1* | 11/2006 | Hauge et al. | 380/262 |
| 2006/0294370 A1* | 12/2006 | Greenspan | 713/164 |
| 2007/0083759 A1* | 4/2007 | Drew et al. | 713/168 |
| 2007/0136576 A1* | 6/2007 | Chambers et al. | 713/164 |
| 2007/0180271 A1* | 8/2007 | Hatakeyama et al. | 713/193 |
| 2007/0183031 A1* | 8/2007 | Xu | G02B 23/16 |
| | | | 359/399 |
| 2007/0266242 A1 | 11/2007 | Yamaguchi | |
| 2008/0046737 A1 | 2/2008 | Mihm et al. | |
| 2008/0082836 A1* | 4/2008 | Osaki | 713/193 |
| 2008/0162770 A1* | 7/2008 | Titiano | G06F 1/3203 |
| | | | 710/309 |
| 2008/0165973 A1* | 7/2008 | Miranda Gavillan et al. | |
| | | | 380/278 |
| 2008/0288785 A1* | 11/2008 | Rao | G06F 12/1408 |
| | | | 713/190 |
| 2008/0301467 A1* | 12/2008 | Saito | G06F 12/1408 |
| | | | 713/190 |
| 2009/0214040 A1 | 8/2009 | Funk et al. | |
| 2010/0115286 A1* | 5/2010 | Hawkes | G06F 12/1408 |
| | | | 713/189 |
| 2010/0128874 A1 | 5/2010 | Scott-Nash | |
| 2010/0131747 A1* | 5/2010 | Kurimoto | G06F 21/78 |
| | | | 713/2 |
| 2010/0146303 A1 | 6/2010 | Kothari et al. | |
| 2010/0161895 A1* | 6/2010 | Qualls et al. | 711/111 |
| 2010/0281532 A1* | 11/2010 | Deng et al. | 726/11 |
| 2010/0299538 A1 | 11/2010 | Miller | |
| 2011/0154061 A1 | 6/2011 | Chilukuri et al. | |
| 2012/0005411 A1* | 1/2012 | Rolandi et al. | 711/103 |
| 2012/0216049 A1 | 8/2012 | Boivie et al. | |
| 2013/0067245 A1* | 3/2013 | Horovitz et al. | 713/193 |
| 2013/0297948 A1 | 11/2013 | Lee et al. | |
| 2014/0019711 A1* | 1/2014 | Leggette et al. | 711/208 |
| 2014/0095876 A1* | 4/2014 | Smith et al. | 713/171 |
| 2014/0281587 A1 | 9/2014 | Ignatchenko | |
| 2015/0149788 A1 | 5/2015 | Gupta et al. | |
| 2016/0179702 A1 | 6/2016 | Chhabra et al. | |
| 2016/0364343 A1 | 12/2016 | Case et al. | |
| 2017/0185809 A1 | 6/2017 | Kishinevsky et al. | |
| 2018/0115533 A1 | 4/2018 | Wielicki et al. | |

FOREIGN PATENT DOCUMENTS

| | | |
|---|---|---|
| TW | 200602973 A | 1/2006 |
| WO | 2005006197 A2 | 1/2005 |

OTHER PUBLICATIONS

Announcing the Advanced Encryption Standard (AES), Nov. 2001, Federal Information Processing Standards Publication 197.*

John (John et al, "Effective Implementation of DES Algorithm for Voice Scrambling", ISBN 978-3-642-34135-9, International Conference, SNDS , p. 75-84, Oct. 2012).*

FIPSP (Federal Information Processing Standards Publication 197, Announcing the Advanced Encryption Standard (AES), Nov. 2001).*

Maxim DS89C420 Ultra-High-Speed Microcontroller datasheet; 58 pages.

International Search Authority for International Application No. PCT/US15/35951 dated Mar. 7, 2016; 4 pages.

Written Opinion of the International Searching Authority for International Application No. PCT/US15/35951 dated Mar. 7, 2016; 5 pages.

European Search Report for International Application No. 15171989 dated Oct. 28, 2015; 7 pages.

Atmel Xmega A 8-bit Microcontroller manual; 432 pages. 80771-AVR-11/2012, Nov. 2012, Author unknown, the document published at ww1.microchip.com/downloads/en/DeviceDoc/doc8077.pdf.

USPTO Notice of Allowance for U.S. Appl. No. 15/850,207 dated Aug. 8, 2018; 9 pages.

* cited by examiner

ENCRYPTION METHOD FOR EXECUTE-IN-PLACE MEMORIES

PRIORITY

This application claims the priority and benefit of U.S. Provisional Application No. 62/014,860 filed on Jun. 20, 2014, the entire contents of which are incorporated by reference herein.

TECHNICAL FIELD

This disclosure relates to the field of external memory devices.

BACKGROUND

The microcontrollers in some systems and devices are configured to execute-in-place (XIP) code from memory devices that are external to the microcontrollers. For example, a microcontroller and an external (e.g., flash) memory device may be disposed on a printed circuit board (PCB), or equivalent structure, and coupled to each other over PCB tracks, traces, or equivalents. In such system or device, however, using an external memory device to store the code image for a microcontroller has the inherent risk of theft of the code it contains. For example, a malicious party may physically remove the external memory device and may subsequently download (or otherwise) extract the code image stored therein.

One approach to address this issue may be to keep the code image on the external memory device in encrypted form and, when needed for execution, to copy the encrypted image to random access memory (RAM) within the microcontroller and decrypt it there. One drawback of this approach, however, is that it requires a large internal cache or RAM memory (e.g., to hold the encrypted and unencrypted copies of the code image), which a microcontroller typically does not have since it is the reason why an external memory device is being used in the first place. Another drawback is that this approach simply defeats the purpose of XIP code execution. For this reason, at present most (if not all) microcontroller providers offer no protection against code theft when using external memory with their microcontroller devices.

DETAILED DESCRIPTION

Figure 1:
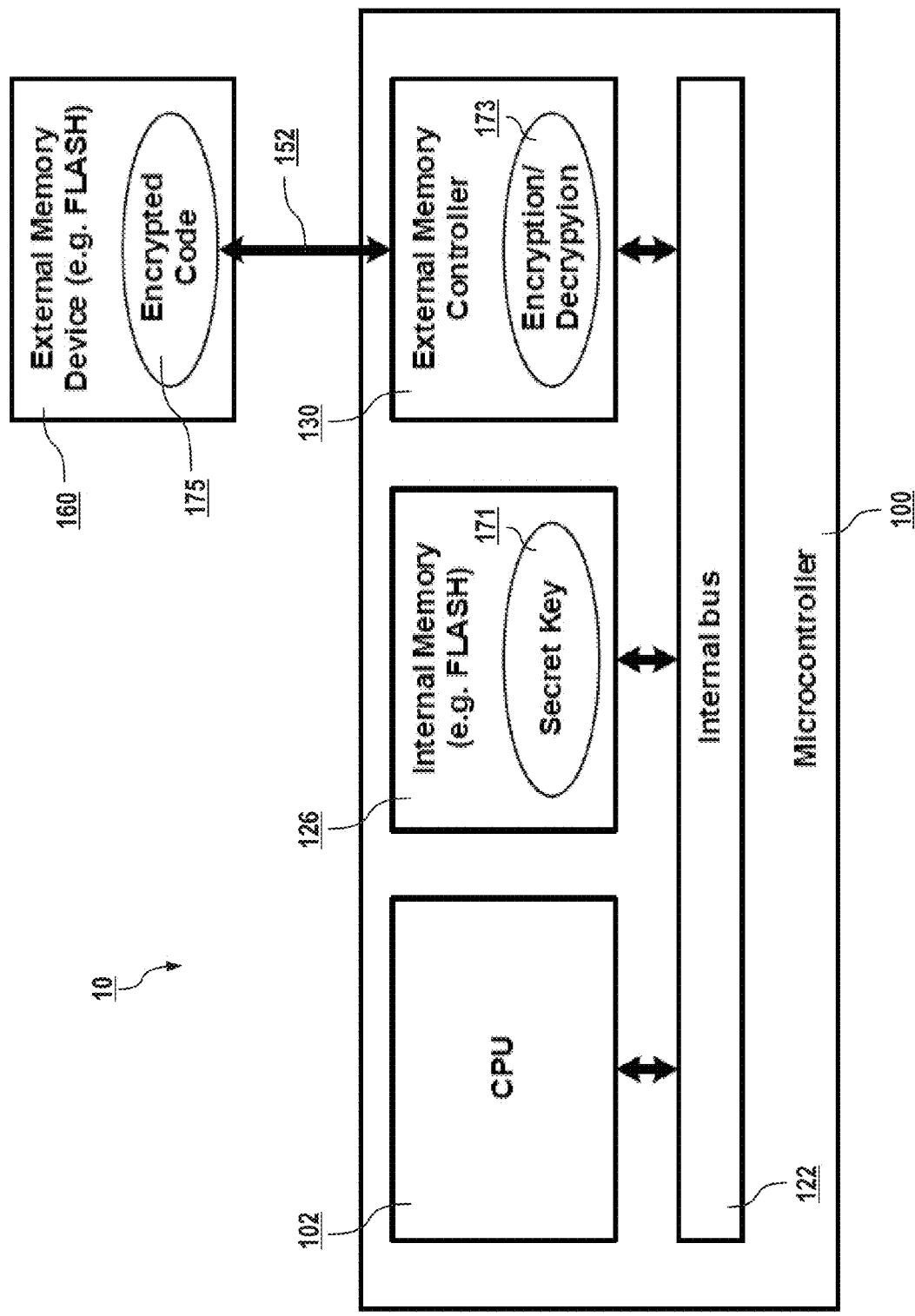
FIG. 1 illustrates an example system in which example embodiments may be implemented.

The following description sets forth numerous specific details such as examples of specific systems, components, methods, and so forth, in order to provide a good understanding of various embodiments of the encryption/decryption techniques for external and/or serial memory that are described herein. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

References in the description to "an embodiment", "one embodiment", "an example embodiment", "some embodiments", and "various embodiments" mean that the particular feature, structure, or characteristic being referred to is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

In various embodiments, the encryption/decryption techniques described herein may comprise one or more methods that are executed by one or more devices and/or controllers thereof. Although the operations of such method(s) are shown and described hereinafter in a particular order, the operations of each method may be altered so that certain operations may be performed in a different order or so that certain operation(s) may be performed, at least in part, concurrently and/or in parallel with other operations. In other embodiments, instructions or sub-operations of distinct operations may be executed in an intermittent and/or alternating manner. Thus, the various method embodiments of the described techniques, as well as the order of operations therein, are to be regarded in an illustrative rather than a restrictive sense.

In an example embodiment of the encryption/decryption techniques described herein, a device comprises an internal memory and an external memory controller. The internal (e.g., volatile or non-volatile) memory is configured to store a secret key. The external memory controller is configured to encrypt, with the key, an address for an access operation (e.g., a write or read operation) to an external memory device to obtain an encrypted address, and to encrypt (e.g., for the write operation) or decrypt (e.g., for the read operation) a block of data for the access operation based on the encrypted address. In some aspects of this embodiment, the controller is configured to communicate with the external memory device over a serial interface. In some aspects, the device can be a monolithic integrated circuit (IC) device fabricated on the same substrate as the internal memory— e.g., such as a semiconductor die that is packaged in a chip-carrier package. In some alternative embodiments, a device can be composed of two or more IC chips that are formed in one IC package such as, for example, a multi-chip module.

In an example embodiment of the encryption/decryption techniques described herein, a method comprises: a controller receiving a read operation for a block of data from a memory device; the controller encrypting, with a key, an address for the read operation to obtain an encrypted address; the controller receiving an encrypted copy of the block of data from the memory device; and the controller decrypting the encrypted copy of the block of data based on the encrypted address, to obtain the block of data. In some aspects of this embodiment, encrypting the address for the read operation is based on a first encryption algorithm that takes more clock cycles than a second encryption algorithm that is used in decrypting the encrypted copy of the block of data. In some aspects, the encrypted copy of the block of data is decrypted by using an operation that takes no more than one clock cycle. In some aspects, the address for the read operation is encrypted with an encryption algorithm having a latency that is less than or equal to a latency of a transfer operation, by the controller, that transfers the block of data from the memory device. In various aspects, the memory device may be an external non-volatile memory device or an off-chip static RAM (SRAM) memory disposed in the same or different package as the controller.

In an example embodiment of the encryption/decryption techniques described herein, a system comprises one more external memory devices and a controller that is coupled to the external memory device(s) over printed circuit board (PCB) tracks, traces, wires, or equivalent structures. An external memory device stores an image encrypted with a secret key. The controller is configured to encrypt, with the key, an address for a read operation to obtain an encrypted address, where the address specifies a block of data in the image. The controller is further configured to receive an encrypted copy of the block of data from the external memory device, and to decrypt the encrypted copy of the block of data based on the encrypted address. In some aspects of this embodiment, the controller is configured to communicate with the external memory device(s) over a serial interface. In some aspects, the controller is configured to change the key with a new key when the image in the external memory device is replaced by a new image. In some aspects, the external memory device stores a plurality of images, each of the plurality of images being associated with one of a plurality of keys.

In some embodiments, the described encryption/decryption techniques (and/or certain operations thereof) may be embodied as a set of instructions that are stored on non-transitory computer-readable storage media. Such instructions, when executed by one or more central processing units (CPUs) and/or controller(s) of a device, cause the one or more CPUs and/or controller(s) to perform the encryption/decryption techniques (and/or certain operations thereof) that are described herein. A non-transitory computer-readable storage medium may include one or more mechanisms for storing information in a form that is readable by a machine (e.g., such as a device or a system). Examples of such non-transitory computer-readable storage media may include, without limitation, electromagnetic storage medium (e.g., hard disks and the like), optical storage medium (e.g., CD-ROMs and the like), magneto-optical storage medium, read-only memory (e.g., ROM and the like), random-access memory (e.g., RAM and the like), erasable programmable memory (e.g., EPROM, EEPROM, and the like), volatile and non-volatile flash memory, various types of firmware (e.g., such as firmware implemented in hardware block(s)), or any other now-known or later-developed type of medium that is suitable for storing information and/or executable instructions.

Microcontrollers that execute "in-place" code from external flash memory continuously fetch instructions or data from the external memory device. In this context, executing "in-place" (XIP) means that a CPU in the microcontroller fetches its program instructions from the external memory device as it is executing them, e.g., without first copying them to RAM that is internal to the microcontroller. When the code image is stored in encrypted form on the external memory device, the microcontroller performance is determined by the time it takes to fetch data from the external memory and decrypt it. However, running a standard (e.g., strong) decryption algorithm, e.g., such as Advanced Encryption Standard (AES) or other FIPS-approved cryptographic algorithm, on the data takes significant time compared to the time it takes to fetch data from an external flash memory device.

To address these and other issues, encryption/decryption techniques are provided herein that allow for storing code images in encrypted form on external or serial memory devices and for performing encryption/decryption of addressable data blocks from the code images on-the-fly without hindering microcontroller performance.

As used herein, "block of data" ("data block") refers to a unit of data that is unambiguously identified by an address. A 32-bit (4-byte) word is but one example of such individually-addressable block of data. It is noted, however, that in various embodiments the size of a data block may depend on various parameters—e.g., the size of the CPU instructions used in a particular system, the type of the instruction set, the size of the address space used for external memory, the size of the address itself, and the like. Thus, in various embodiments the techniques described herein may be used to perform encryption/decryption on blocks of data that may vary in size from 1 byte up to 32 bytes (or even more, if larger data block size provides performance and/or security benefit for some particular embodiments). It is also noted that depending on the type of external memory device, a write operation may be performed on a group of multiple data blocks. For example, some NOR flash memory devices perform write operations in larger data chunks (e.g., 512 bytes) than the associated read operations (e.g., 1 byte). Thus, for such NOR flash devices, a write operation according to the techniques described herein is performed for a group of multiple data blocks that are respectively identified by multiple addresses, while a read operation is performed for each individual data block and its identifying address.

FIG. 1 illustrates a system 10 in which example embodiments may be implemented. Examples of such systems include, without limitation, microcontrollers with internal RAM memory that is not enough (or not configured) to hold all the code that needs to be executed, systems that execute code from external XIP memory, systems that use memory mapped input/output (MMIO) mode to access external memory devices, application-specific integrated circuits (ASICs), field-programmable gate arrays (FPGAs), application processors, digital signal processors (DSPs), networking controllers, video and audio controllers, and the like.

Among other components (not shown in FIG. 1), system 10 includes microcontroller 100 that is coupled to one or more external (e.g., flash) memory devices 160 that are external (e.g., off-chip) to the chip or chip-module that houses the microcontroller. For example, microcontroller 100 and an external memory device 160 may be disposed on the same PCB board, or equivalent structure, and may be coupled to each other over PCB tracks/pads, switches, buses, hubs, trace lines, interconnects, wires, and/or any other types of equivalent signal-conducting means. In various embodiments, microcontroller 100 and external memory device 160 are coupled over a serial interface 152. Examples of such serial interfaces include, without limitation, $I^2C$, Serial Peripheral Interface (SPI), Dual-SPI (DSPI), Quad-SPI (QSPI), SD-SPI, and the like.

Microcontroller 100 is typically fabricated on a single chip or chip module. Among other components (not shown in FIG. 1), microcontroller 100 includes CPU 102, internal (e.g., flash) memory 126, and external memory controller 130. CPU 102 is coupled over internal bus 122 to internal memory 126 and to external memory controller 130. For example, CPU 102 may be configured to read(write) from (to) internal memory 126 over internal bus 122, as well as to send instructions to external memory controller 130 as part of XIP or MMIO execution of code that is stored in external memory device 160. Internal memory 126 may be any type of non-volatile memory that is embedded on the same die as CPU 102 (e.g., the internal memory may be within the same microcontroller chip as the CPU). Thus, internal memory 126 is typically limited in size and cannot, or is not configured to, store large code images for execution by CPU 102. External memory controller 130 is coupled over serial interface 152 to external memory device 160. External memory controller 130 may be implemented as one or more hardware blocks, within microcontroller 100, that are coupled to internal bus 122. For example, external memory controller 130 may be implemented as a fixed-function or programmable block within microcontroller 102, but it is noted that various types of IC elements may be used to implement the external memory controller within the microcontroller chip.

External memory device 160 comprises a serial flash memory (e.g., such as NOR flash) that is large enough to store one or more code images and may be configured for XIP execution and/or for MMIO access. As used herein, a "code image" (or just "image") refers to a set of instructions or data that is operable to perform, or is used in performing, one or more functions. In various embodiments and implementations, any such image may be implemented, without limitation, as file(s), program(s), software application(s), module(s), or as any other type of code (or data) that can be executed (or accessed during execution) by a CPU. When executed by the CPU, a particular image may be embodied as one or more computer processes, threads, or any other run-time entities that are allocated computing resources (e.g., such as RAM, CPU time, storage space, and network bandwidth) to perform the image's function(s). In various embodiments, external memory device 160 may have various form factors. For example, external memory device 160 may be a 3 to 9-pin device that may be configured to fit into a pre-defined (e.g., card) slot or that may be affixed to the underlying PCB board (or equivalent structure).

According to the encryption/decryption techniques described herein, CPU 102 generates, or receives from another component of system 10, a secret key 171 that is persistently stored in internal memory 126. Secret key 171 is used to encrypt one or more code images (e.g., encrypted image 175) that are stored on one or more external memory devices (e.g., external memory device 160). For example, in some embodiments encrypted image 175 may be generated outside of system 10 and may be programmed into external memory device 160 prior to the external memory device being disposed in system 10 (e.g., prior to the manufacture and/or assembly of the system). In these embodiments, CPU 102 may be configured to receive secret key 171 when system 10 is initialized and/or activated (e.g., such activating a mobile device). In another example, in some embodiments CPU 102 may be operable to generate secret key 171 and to persistently store it in internal memory 126. In these embodiments, external memory controller 130 may be configured to receive or retrieve secret key 171 from internal memory 126, to use encryption/decryption block 173 according to the techniques described herein to encrypt image 175 with key 171, and to store the encrypted image 175 in external memory device 160.

In operation according to the techniques described herein, external memory controller 130 is configured to use encryption/decryption block 173 to perform on-the-fly encryption and decryption, based on secret key 171, for CPU-initiated read and write operations that access encrypted image 175 in external memory device 160.

For read access to encrypted image 175, external memory controller 130 receives the instruction code and the address of a read operation that is placed by CPU 102 on internal bus 122. Concurrently with transferring the instruction code and/or the address to external memory device 160 over serial interface 152, external memory controller 130 uses secret key 171 to encrypt the address of the read operation in order to generate an encrypted address, e.g., by using a strong (but relatively slow) encryption algorithm such as AES-128. When external memory device 160 responds with the encrypted copy of the block of data stored at the requested address in encrypted image 175, external memory controller 130 decrypts the encrypted copy of the block of data based on the encrypted address, e.g., by using a weak (but fast) encryption function, such as XOR (exclusive OR), on the encrypted address and the encrypted copy of the block of data. External memory controller 130 then returns the (unencrypted) block of data in response to the read operation— e.g., by placing the block of data on internal bus 122.

For write access to encrypted image 175, external memory controller 130 receives the instruction code, the address, and the (unencrypted) block of data of a write operation that is placed by CPU 102 on internal bus 122. Concurrently with transferring the instruction code and/or the address to external memory device 160 over serial interface 152, external memory controller 130 uses secret key 171 to encrypt the address of the write operation in order to generate an encrypted address, e.g., by using a strong encryption algorithm such as AES-128. Since the instruction code and/or the address of the write operation is/are transferred first to external memory device 160, external memory controller 130 has sufficient time (e.g., as measured in clock cycles) to use the strong but relatively slow encryption algorithm to generate the encrypted address, which allows the encrypted address to be generated before the external memory controller needs to start transferring the block of data to external memory device 160. Thus, after the encrypted address is generated, external memory controller 130 encrypts the block of data based on the encrypted address to generate an encrypted copy of the block of data, e.g., by using a weak (but fast) encryption function, such as XOR, on the encrypted address and the block of data. External memory controller 130 then transfers the encrypted copy of the block of data to external memory device 160, which stores the encrypted copy of the block of the data at the specified address in encrypted image 175.

The encryption/decryption techniques described herein do not add substantial latency to the write/read operations that request access to the external memory device because the encryption/decryption function is performed in parallel and/or concurrently with other transfer-related functions and is substantially completed before the start of the transfer of the encrypted/decrypted data to/from the external memory device. At the same time, the techniques described herein avoid using a strong (but relatively slow) encryption to directly encrypt/decrypt the data of the write/read operations, but still offer the same high level of security as if that were done. In this manner, the techniques described herein provide strong encryption of code images that are stored in external memory devices, thereby greatly reducing the risks of product counterfeiting and code theft since even if the encrypted images are extracted from the external memory device decrypting them without the secret key would be very difficult.

The encryption/decryption techniques for external memory described herein are based, at least in part, on the following observations:

it takes time (e.g., as measured in clock cycles) for the external memory controller to fetch a block of data from the external memory, once a request is obtained for data at a specific address;

it takes a comparable amount of time (e.g., clock cycles) to perform an encryption/decryption step using a strong encryption algorithm, e.g., such as AES-128;

while both the speed of accessing external memory and the speed of encryption may vary depending on hardware platforms and design choices, they both are usually in the same order of magnitude;

since accessing the external memory and performing encryption/decryption are performed concurrently, rather than one after the other, a substantial increase in microcontroller performance is achieved while still providing strong encryption for the external memory data.

One of the reasons the techniques described herein can achieve the desired microcontroller performance is because the strong but slow encryption is performed on the address, which is typically available at the start, rather than the end of the transfer to/from external memory. The encrypted address is then used in a fast, but less strong, encryption function (e.g., XOR) with the data coming in towards the end of the transfer. For example, in some embodiments the techniques described herein can hide the latency caused by the strong (e.g., AES-128) decryption wholly or very substantially behind the latency of the fetching of the data itself, thereby improving performance by roughly 2×. It is noted that in various embodiments, the precise performance improvement may depend on the frequency of the external memory vs. the internal computation and the number of clock cycles required for the strong (e.g., AES-128) encryption/decryption.

It is noted that some conventional approaches may implement encryption for external memory by using a caching mechanism that first copies the entire code image from an external memory device into a local cache (e.g., a CPU cache or an internal SRAM), then encrypts or decrypts the entire image in the cache, and then executes the decrypted code by accessing its data blocks in the cache. Such conventional approaches, however, incur the latency of the encryption operation on the entire code image and use extra RAM/cache space to hold an extra copy of the code image (if such extra space is even available or configurable in the microcontroller). In contrast, the encryption/decryption techniques described herein avoid these drawbacks of conventional approaches by providing on-the-fly encryption and decryption of data blocks from encrypted images stored on external memory, but without incurring the latencies typically associated with strong encryption and without requiring extra RAM or internal cache space.

In some embodiments, the techniques for encryption/decryption described herein provide for using AES-128 encryption algorithm to encrypt the address rather than the data of the data block being cyphered. For example, for read access, this strong encryption operation on the address is performed concurrently with the transaction, in the external memory controller, that fetches the encrypted data block from the external memory device. The result of the encryption operation is then XOR-ed (a relatively weak encryption/decryption function) with the fetched data block in order to generate an un-encrypted copy of the data block. This method offers protection equal to that of encrypting the data itself, provided that the secret key used by the strong encryption algorithm is changed whenever the code image is changed and stored in encrypted form on the external memory device.

In some embodiments, the encryption/decryption techniques described herein may be used in devices or systems that use multi-cycle memory interfaces to external or off-chip SRAM memories. Examples of such multi-cycle memory interfaces include serial memory interfaces (e.g., such as SPI, DSPI, QSPI, and the like) as well as some parallel memory interfaces (e.g., such as some DRAM interfaces). A multi-cycle memory interface typically uses some or even considerable amount of time (e.g., at least several clock cycles) from the point of initiating a transfer transaction to/from the memory device to the point of actually commencing the transfer of the data for the transaction. The techniques described herein leverage this feature of multi-cycle memory interfaces by using this amount of time to perform a relatively slow, but strong, encryption algorithm on the address for the transfer transaction to obtain an encrypted address. The encrypted address is then used with the data for the transfer operation in a fast encryption function that may be performed in one clock cycle or even less—e.g., such as XOR or an equivalent logical function.

Figure 2:
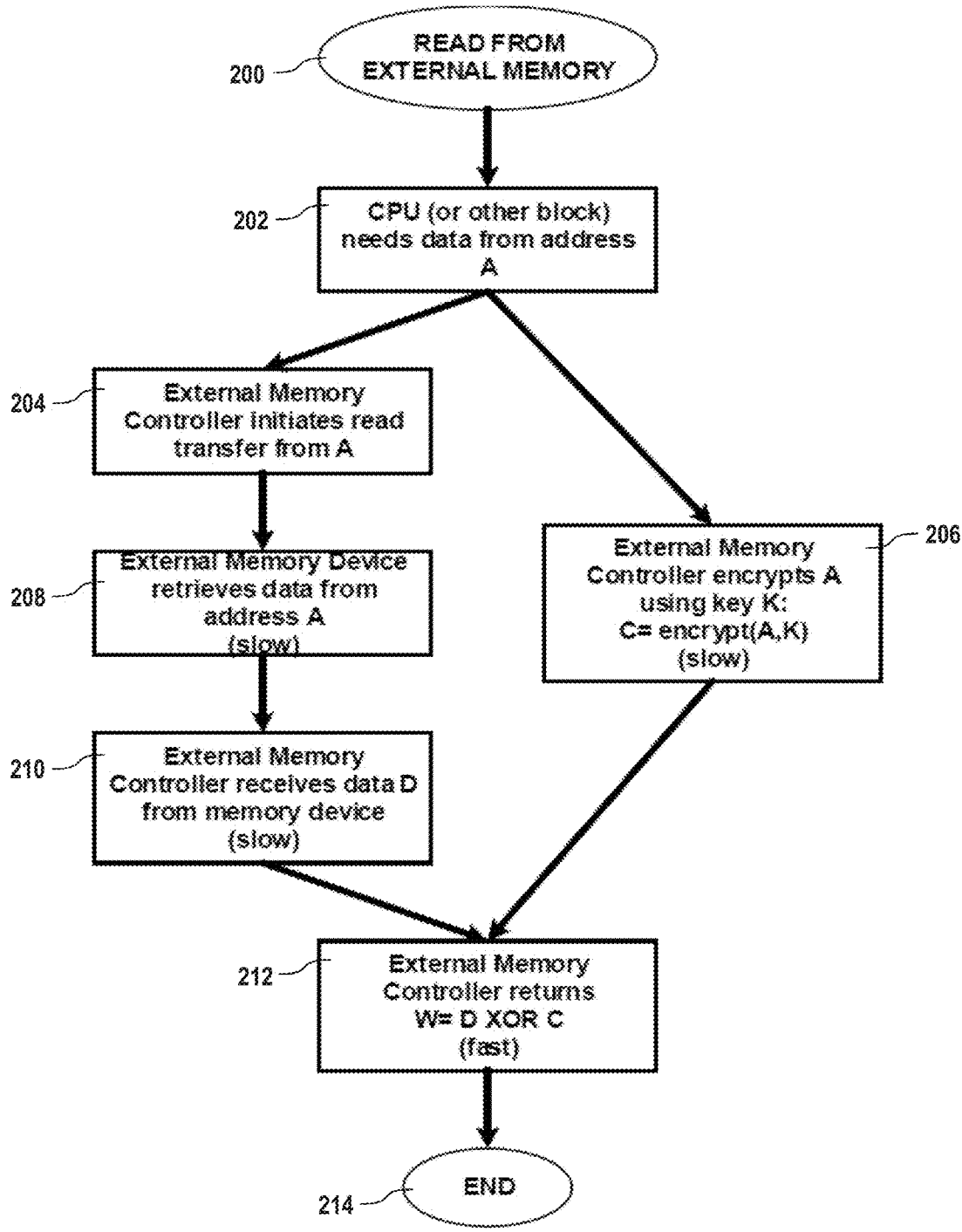
FIG. 2 is a flow diagram illustrating an example method for reading from an external memory device according to some example embodiments.

FIG. 2 is a flow diagram illustrating an example method for reading from an external memory device according to some example embodiments of the encryption/decryption techniques described herein. The various operations in FIG. 2 are described hereinafter as being performed by components of a microcontroller (e.g., a CPU and an external memory controller). It is noted, however, that various implementations and embodiments may use different, and possibly multiple, components to perform the operations in FIG. 2. For example, in various embodiments such components may be implemented in a single IC component or their functionality may be spread across two or more components (e.g., in the same chip module) that may perform some additional operations and functionalities. Thus, the description hereinafter of the operations in FIG. 2 is to be regarded in an illustrative rather than a restrictive sense.

In operation 202, a CPU (or some other microcontroller component) initiates read operation 200 to read a block of data from an address ("A") associated (or assigned) to an external memory device. For example, the CPU may place the instruction code and the address of the read operation on an internal bus that couples the CPU to an external memory controller, where the address indicates the block of data needed by the CPU. After receiving the read operation and its address, the external memory controller performs operation 206 concurrently (and/or in parallel) with operations 204, 208, and 210. In this way, the external memory controller hides the latency of the relatively slow (strong encryption) operation 206 behind the latencies of operations 204, 208, and 210, so that the overall latency of read operation 200 is not increased because of the encryption.

In operation 206, the external memory controller uses a strong encryption algorithm to encrypt the received address ("A") using a secret key ("K") to obtain an encrypted address ("C"), e.g., C=encrypt (A, K)

where the external memory controller may receive or retrieve the secret key from non-volatile memory within the microcontroller. For example, the external memory controller may use the secret key ("K") to apply an AES-128 algorithm to the address ("A") to generate the encrypted address ("C"). It is noted that since a strong encryption algorithm is used, operation 206 is relatively slow.

Concurrently with operation 206, in operation 204 the external memory controller initiates a read transfer for the encrypted data block ("D") at address ("A") in the external memory device. In operation 208 the external memory controller commences retrieval of the data block ("D") from the external memory device, and in operation 210 the retrieval is complete and the external memory controller has received the entire data block ("D"). It is noted that since the external memory controller is coupled to the external memory device over a multi-cycle (e.g., serial) interface, operations 208 and 210 are relatively slow. However, since the speed of accessing the external memory device (e.g., as in operations 208 and 210) is not faster than the speed of encryption (e.g., as in operation 206), the external memory controller has obtained both the encrypted address ("C") and the encrypted data block ("D") by the time operation 210 is complete.

Thereafter, in operation 212 the external memory controller decrypts the data block ("D") to obtain the decrypted data block ("W") by applying an XOR function to data block ("D") and the encrypted address ("C"), e.g.,

W=D XOR C

It is noted that while having relatively weak encryption properties, the XOR function is extremely fast, typically one clock cycle or less.

Thereafter, the external memory controller returns the decrypted data block ("W") in response to read operation 200, and the read operation ends at 214. For example, after obtaining the decrypted data block ("W"), the external memory controller places the decrypted data block on the internal bus so that it can be retrieved by the CPU that requested the read operation.

Figure 3:
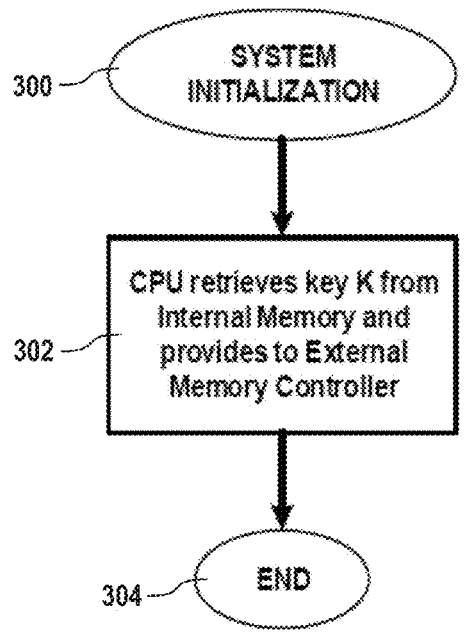
FIG. 3 is a flow diagram illustrating an example method for system initialization according to some example embodiments.

FIG. 3 is a flow diagram illustrating an example method for system initialization according to some example embodiments. The various operations in FIG. 3 are described hereinafter as being performed by a CPU, but it is noted that that various implementations and embodiments may use different, and possibly multiple, components of a microcontroller to perform the operations in FIG. 3. For example, in various embodiments such components may be implemented in a single IC component or their functionality may be spread across two or more components (e.g., in the same chip module) that may perform some additional operations and functionalities. Thus, the description hereinafter of the operations in FIG. 3 is to be regarded in an illustrative rather than a restrictive sense.

In FIG. 3, system initialization operation 300 initializes a system or device with a secret key that corresponds to an image that is stored, or is to be stored, in an external memory device coupled to the system/device. In operation 302, a CPU retrieves a secret key ("K") from an internal non-volatile memory (of the system/device) and provides the key to the external memory controller. Thereafter, the external memory controller may use the secret key ("K") for access operations to the image on the external memory device. For example, the external memory controller may use the secret key ("K") as part of read operations to decrypt data blocks stored in the image (e.g., as described above with respect to FIG. 2). In addition, or instead of, the external memory controller may use the secret key ("K") as part of write operations to encrypt data blocks that are then stored in the image in encrypted form (e.g., as described below with respect to FIG. 4).

It is noted that in various embodiments the secret key ("K") may be stored in the internal non-volatile memory at various times. In some embodiments, the secret key and the image encrypted with it may be generated ahead of time and in a different system than the system/device in which initialization operation 300 is performed. For example, the secret key may be generated and used by a given company to encrypt an image, which is then programmed into an external memory device. The external memory device (but not the secret key) may then be shipped to an equipment manufacturer (possibly located in another country), which assembles the external memory device into an electronics product (e.g., such as a smartphone, tablet, etc). The assembled electronics product is then shipped back to the company, which may provision the secret key to the non-volatile memory of the electronics product and perform the system initialization operation 300 of FIG. 3 to activate the product at the point-of-sale. In this manner, the company can effectively protect its electronics product from counterfeiting since no other party, not even the equipment manufacturer that assembled the electronics product, has access to the secret key prior to the product being activated (e.g., at a retail store).

In other embodiments the secret key may be provided or generated in the system or device in which initialization operation 300 of FIG. 3 is performed; by way of illustration, the key may be provided to the system for each session that needs to use it, or may be generated at the time or just before a new image is to be stored in the external memory device. For example, the system/device may be an electronics product (e.g., a smartphone, tablet, etc.) that needs to be provisioned with a new image that is to be stored in encrypted form on the external memory device (e.g., as part of a hardware upgrade). To facilitate the provisioning, the electronics product may be configured to execute some instructions that generate the secret key (e.g., as a random or pseudo-random number). After generating the secret key, the electronics product may perform the system initialization operation 300 of FIG. 3 to store the key in non-volatile memory and to provide the key to its external memory controller. Thereafter, the electronics product may receive the new image over some communication means (e.g., wirelessly Over-The-Air (OTA) or over a wired connection such as a Universal Serial Bus (USB)). After receiving the new image and/or during the image transmittal, the external memory controller in the electronics product may use the secret key to encrypt the received image prior to storing it in the external memory device (e.g., as described below with respect to FIG. 4). In this manner, a new secret key can be generated and persistently stored each time a new image is provisioned/stored in external memory, which provides stronger security without hindering the electronics product performance (both during provisioning the product with the new image and during operation when the encrypted image is accessed in the external memory).

Figure 4:
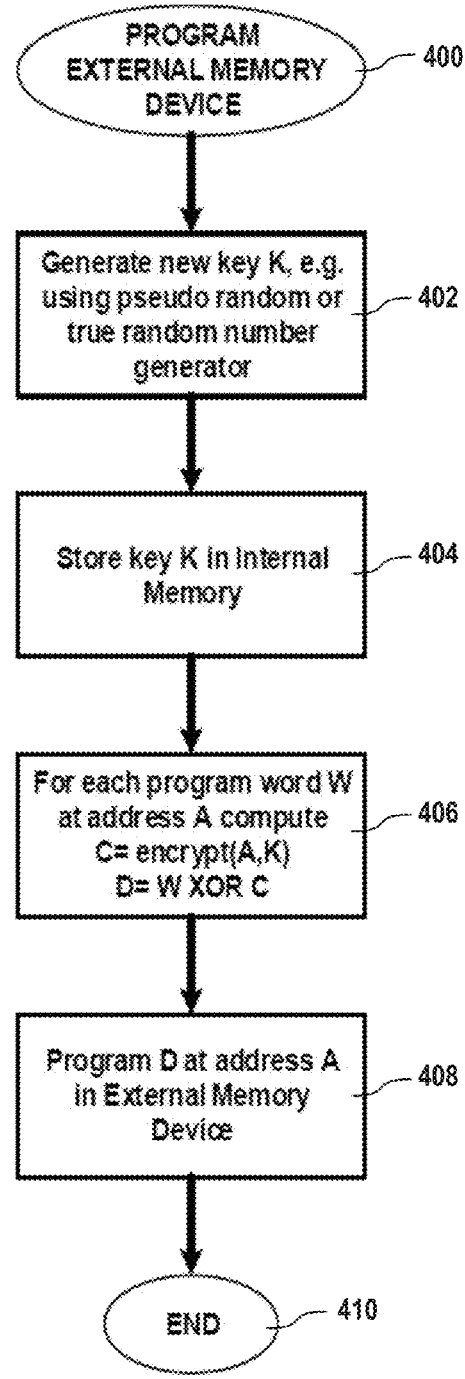
FIG. 4 is a flow diagram illustrating an example method for programming an external memory device according to some example embodiments.

FIG. 4 is a flow diagram illustrating an example method 400 for programming an external memory device with an encrypted image according to some example embodiments of the encryption/decryption techniques described herein. The various operations in FIG. 4 are described hereinafter as being performed by components of a microcontroller (e.g., a CPU and an external memory controller). It is noted, however, that various implementations and embodiments may use different, and possibly multiple, components to perform the operations in FIG. 4. For example, in various embodiments such components may be implemented in a single IC component or their functionality may be spread across two or more components (e.g., in the same chip module) that may perform some additional operations and functionalities. Thus, the description hereinafter of the operations in FIG. 4 is to be regarded in an illustrative rather than a restrictive sense.

In operation 402, a CPU (or some other microcontroller component) generates a new secret key ("K"). For example, the CPU may use a pseudo-random or true random number generator to generate a secret key that has a length appropriate for use in a selected strong encryption algorithm. In operation 404, the CPU stores the secret key ("K") in internal non-volatile memory. It is noted that operations 402 and 404 may be performed ahead of time and/or in a different system than the system or device in which the programmed external memory device is going to be used, or may be performed at the time an image is to be encrypted and stored in the external memory device. It is also noted that operations 402 and 404 may be performed in a system that includes both the CPU and the external memory device, or may be performed in a system set up solely for the purpose of programming an image into the external memory device (which may be assembled into a different system/device at a later time).

Prior to operation 406, a controller (e.g., such as an external memory controller) retrieves or receives the secret key ("K") from the internal non-volatile memory and also receives a write operation to write a data block (e.g., such as word "W") at an address ("A") associated (or assigned) to an image in an external memory device. For example, as part of programming the image into the external memory device, a CPU may place the instruction code, the address, and the data block of the write operation on an internal bus that couples the CPU to the controller. After receiving the write operation and its address ("A") and data block ("W"), the controller performs operation 406 concurrently (and/or in parallel with) other operations that are involved in the transfer of the data block from the controller to the external memory device. In this way, the controller hides the latency of the encryption operation 406 behind the latencies of the other transfer operations, so that the overall latency of the write operation is not increased because of the encryption.

In operation 406, the controller first uses a strong encryption algorithm to encrypt the received address ("A") using the secret key ("K") to obtain an encrypted address ("C"), e.g., C=encrypt (A, K)

For example, the external memory controller may use the secret key ("K") to apply an AES-128 algorithm to the address ("A") to generate the encrypted address ("C"). Then, the controller encrypts the data block ("W") to obtain the encrypted data block ("D") by applying an XOR function to data block ("W") and the encrypted address ("C"), e.g.,

D=W XOR C

Then, in operation 408 the encrypted data block ("D") is stored at the address ("A") in the external memory device. The controller then proceeds to determine whether there are any more data blocks to be processed as part of the write operation (in which case the controller repeats operations 406 and 408), or the write operation ends at 410.

It is noted that that depending on the type of external memory device, in some embodiments a write operation may be performed on a group of multiple data blocks. In external memory devices that write data in larger data chunks than the associated reads, operation 406 is performed as part of the write operation separately for each data block (from the group of multiple data blocks) that is identified by its own address. For example, when the write operation involves a group of multiple data blocks, the controller determines the address for each separate data block in the group and then performs operation 406 for that data block. When all of the multiple data blocks in the group are processed in this manner, the controller assembles an encrypted copy of the group of data blocks, and then writes the encrypted copy of the group in operation 408.

In various embodiments, the encryption/decryption techniques described herein may be implemented using a variety of strong encryption algorithms to encrypt the address of an access operation. Examples of such strong encryption algorithms include, without limitation, Date Encryption Standard (DES) and variants thereof (e.g., Triple DES, G-DES, DES-X, etc), AES and variants thereof (e.g., AES-128, AES-192, AES-256, etc), other members of the Rijndael family of ciphers, International Data Encryption Algorithm (IDEA) and variants thereof (e.g., MMB, MESH, IDEA NXT, etc), Twofish, Blowfish, Serpent, CAST-128 (alternatively, CAST5) and CAST-256, RC4, various other symmetric block ciphers, and any other suitable secret-key encryption/decryption algorithms.

In various embodiments, the encryption/decryption techniques described herein may be implemented using a variety of fast logic functions or algorithms to encrypt/decrypt the data block of an access operation based on the encrypted address of the data block. Examples of such fast functions and algorithms may include, without limitation, XOR and XOR-based ciphers, permutation functions, symmetric difference functions, any other kinds of simple logic functions that can be performed within in one (or at most a very few clock cycles) and are reversible.

In various embodiments, the encryption/decryption techniques described herein may be implemented for various types of external and/or off-chip memory devices. Examples of such devices may include, without limitation, flash memory devices, nvSRAM memory devices, SRAM memory devices, FRAM memory devices, etc. Further, in some embodiments the encryption/decryption techniques described herein may be implemented in a system that uses off-chip memory (e.g., SRAM, nvSRAM, etc) to augment the internal memory of a microcontroller. For example, the microcontroller (or an external memory controller thereof) may use on-the-fly encryption/decryption as described herein to store and retrieve encrypted images of code/data that are stored on off-chip, serial SRAM memory.

In some embodiments, the encryption/decryption techniques described herein may be used to provide security for any two devices that are coupled by a multi-cycle interface. For example, the techniques described herein may be used to protect any public channel between two devices, where one device is configured to access an image in the other device repeatedly and by address.

Thus, in an example embodiment a system comprises a first device and a second device, the second device being coupled to the first device over an interface having a multi-cycle delay between initiating a transfer of data and commencing the transfer of data across the interface. The first device is configured to store an encrypted image comprising individually-addressable blocks of data. The second device is configured to: encrypt an address for an access operation to the first device, to obtain an encrypted address; and encrypt or decrypt a block of data for the access operation based on the encrypted address. In one aspect of this embodiment, the encrypted image is stored in the first device prior to the first device being disposed in the system. In another aspect, the first device stores a plurality of encrypted images, each of the plurality of encrypted images being associated with one of a plurality of keys. In another aspect, the second device may be further configured to: encrypt, with a first key of the plurality of keys, a first address for a first read operation to obtain a first encrypted address, the first address specifying a first block of data in a first encrypted image of the plurality of encrypted images; receive an encrypted copy of the first block of data from the first device; and decrypt the encrypted copy of the first block of data based on the first encrypted address. In addition, the second device may be further configured to: encrypt, with a second key of the plurality of keys, a second address for a second read operation to obtain a second encrypted address, the second address specifying a second block of data (e.g., in the same or different encrypted image of the plurality of encrypted images); receive an encrypted copy of the second block of data from the first device; and decrypt the encrypted copy of the second block of data based on the second encrypted address. In another aspect, the second device may be configured to change a key, used to encrypt the encrypted image, with a new key when the encrypted image in the first device is replaced by a new image. In another aspect, the system may further comprise internal memory coupled to the first device, the internal memory being configured to persistently store a key used to encrypt the encrypted image. In another aspect, the access operation is a write operation and the second device is further configured to: receive the write operation to store the block of data at the address in the encrypted image on the first device; encrypt the address with the key to obtain the encrypted address; generate an encrypted copy of the block of data based on the encrypted address; and store the encrypted copy of the block of data at the address in the encrypted image on the external memory device. The write operation may be received as part of an operation to program the first device with the encrypted image, the encrypted image including firmware instructions to upgrade the system.

In some embodiments, the encryption/decryption techniques described herein may be implemented in a programmable system-on-chip. One example of a programmable system-on-chip is a device (e.g., such as PSoC4A-L product) from the Programmable System-on-Chip (PSoC™) family of products offered by Cypress Semiconductor Corporation of San Jose, Calif.

Figure 5:
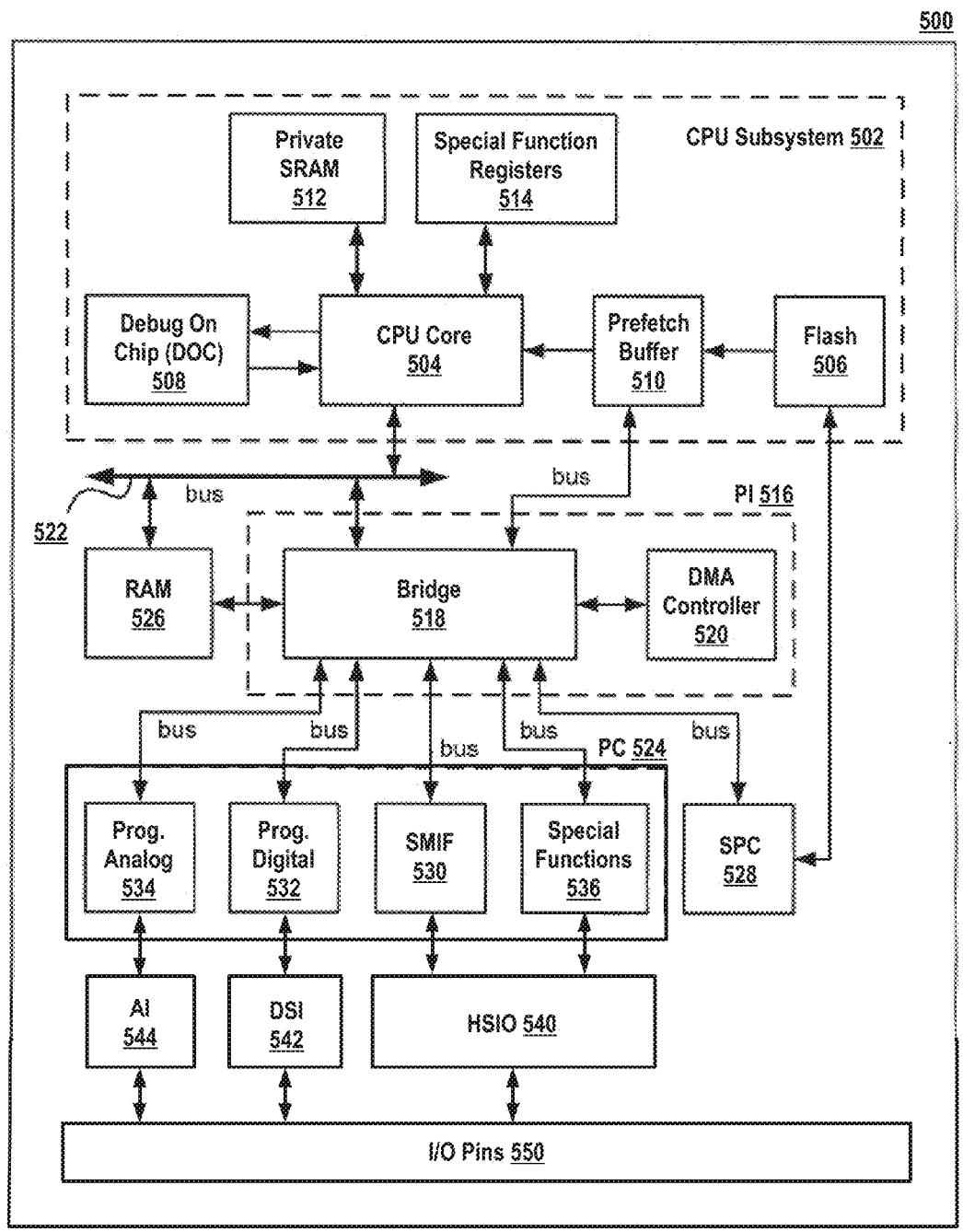
FIG. 5 is a block diagram illustrating an example device in which various example embodiments may be implemented.

FIG. 5 illustrates an example embodiment of a programmable system-on-chip device (e.g., such as a PSoC™ device). In some embodiments, a system-on-chip device (e.g., such as device 500) is fabricated as an IC on a semiconductor die, which is packaged as a chip in a suitable chip-carrier package. As illustrated in FIG. 5, device 500 may be configured as a microcontroller that includes CPU subsystem 502, peripheral interconnect (PI) 516, internal bus 522, programmable core (PC) 524, high-speed input/output (HSIO) matrix 540, digital system interface (DSI) 542, analog interconnect (AI) 544, and input/output (IO) pins 550.

CPU subsystem 502 includes one or more CPUs (or CPU Cores) 504, flash storage 506, debug-on-chip (DOC) 508, prefetch buffer 510, private static random access memory (SRAM) 512, and special functions registers 514. In an embodiment, DOC 508, prefetch buffer 510, private SRAM 512, and special function registers 514 may be coupled to CPU 504, while flash storage 506 may be coupled to prefetch buffer 510. Flash storage 506 can be any type of non-volatile memory, but is typically of limited size.

CPU 504 is configured to execute-in-place, and/or otherwise access, code and data images that are stored in one or more external memory devices (not shown in FIG. 5). According to the encryption/decryption techniques described herein, CPU 504 is configured to generate and/or receive, and persistently store (e.g., in flash storage 506), a secret key that is used by an external memory controller (e.g., such as a SMIF block 530) to perform on-the-fly encryption and decryption of addressable code/data that is stored in an external memory device.

Device 500 includes internal system interconnect bus 522. Internal bus 522 may be, for example, a single-level or multi-level Advanced High-Performance Bus (AHB) that couples CPU subsystem 502 to peripheral interconnect 516 and/or to one or more controllers in programmable core 524. When executing an instruction that accesses an external memory device, CPU 504 places the instruction, its address, and its data (if applicable) on internal bus 522. An external memory controller (e.g., such as a SMIF block 530) receives the instruction and its address, and performs an encryption or decryption on the data according to the techniques described herein.

Device 500 may also include peripheral interconnect 516, which may include bridge 518 (e.g., such as an AHB Bridge) and optionally a direct memory access (DMA) controller 520. Peripheral interconnect 516 is coupled to CPU subsystem 502 via internal bus 522. Peripheral interconnect 516 may provide the primary data and control interface between CPU subsystem 502 and its peripherals and memory, and programmable core 524. DMA controller 520, when present, may be programmed to transfer data between system components without burdening CPU 504. For example, in some embodiments the DMA controller may be configured in accordance with the encryption/decryption techniques described herein to fetch audio, video, or still image data from an external memory device, and to cause such audio, video, or still image data to be displayed on a LCD display in a streaming fashion without the participation of the CPU. In various embodiments, each of these subcomponents of CPU subsystem 502 and peripheral interconnect 516 may be different with each choice or type of CPU 504. Optionally, peripheral interconnect 516 may also be coupled to shared SRAM 526 and system performance controller (SPC) 528. Private SRAM 512 is independent of the shared SRAM 526, which is accessed by CPU subsystem 502 through bridge 518. CPU 504 accesses the private SRAM 512 without going through bridge 518, thus allowing local register and RAM accesses to occur simultaneously with DMA access to shared SRAM 526. It is noted that although SRAM 512 and SRAM 526 may be present in device 500, these internal memory modules are not configured as a local (e.g., CPU) cache and are not otherwise sufficient for encrypting/decrypting entire images that are stored on external memory device(s). It is also noted that although labeled here as SRAM, these memory modules may be any suitable type from a variety of (volatile or non-volatile) memory or data storage modules in various embodiments.

In various embodiments and implementations, programmable core 524 may include various combinations of sub-components (not shown), including, but not limited to, global routing channels, digital processing channels, digital peripherals, analog processing channels, analog peripherals, DMA controller(s), SRAM and other appropriate types of data storage, IO ports, and other suitable types of subcomponents. In the example embodiment illustrated in FIG. 5, programmable core 524 includes serial memory interface (SMIF) block 530 to provide a mechanism to extend the external off-chip access of CPU subsystem 502, programmable digital array 532, programmable analog array 534, and special functions array 536, each configurable and/or programmable to implement one or more of the subcomponent functions. Programmable digital array 532 is coupled to digital system interface 542, which provides the digital blocks in array 532 with routable connectivity to IO pins 550. Programmable analog array 534 is coupled to analog interface 544, which provides analog components of array 534 with routable connectivity to IO pins 550. SMIF block 530 is coupled to HSIO matrix 540, which provides connectivity to IO pins 550. Special functions array 536 is coupled to HSIO matrix 540, which provides the blocks (e.g., such as fixed-function blocks) of array 536 with connectivity to IO pins 550.

Programmable digital array 532 may include an array of digital logic blocks, where digital interconnect 542 may provide routable connectivity between any digital block in the array and any of the IO pins 550. In one embodiment, the digital block architecture is comprised of universal digital blocks (UDBs). For example, each UDB may include an arithmetic logic unit (ALU) together with a complex PLD (CPLD) or other types of digital programmable logic elements. Digital system interface 542 includes a series of components (e.g., buses, switches, etc.) that provide interconnectivity amongst the digital logic blocks (e.g., to allow digital blocks, banks of blocks, and digital channels to be connected to each other, to internal and external reference signals, to mixed-signal blocks, etc.) and that allow signals from any digital block to be routed to any of IO pins 550.

In various embodiments, one or more of such UDBs of programmable digital array 532 may be configured to implement on-the-fly encryption/decryption according to the techniques described herein. Further, one or more UDBs of programmable digital array 532 may be configured to perform various digital functions, including, but not limited to, one or more of the following functions: a basic $I^2C$ slave; an $I^2C$ master; a Serial Peripheral Interface (SPI) master or slave; a multi-wire (e.g., 3-wire) SPI master or slave (e.g., MISO/MOSI multiplexed on a single pin); timers and counters (e.g., a pair of 8-bit timers or counters, a 16-bit timer or counter, a 8-bit capture timer, or the like); pulse-width modulators, or PWMs (e.g., a pair of 8-bit PWMs, a 16-bit PWM, a 8-bit deadband PWM, or the like); a level sensitive I/O interrupt generator; a quadrature encoder; an Universal Asynchronous Receiver/Transmitter, or UART (e.g., half-duplex); delay lines; and any other suitable type of digital function or combination of digital functions which can be implemented in one or more UDBs.

In other embodiments, additional functions may be implemented using a group of two or more UDBs. Merely for purposes of illustration and not limitation, the following functions may be implemented using multiple UDBs: an $I^2C$ slave that supports hardware address detection and the ability to handle a complete transaction without CPU core intervention and to help prevent the force clock stretching on any bit in the data stream; an $I^2C$ multi-master which may include a slave option in a single block; an arbitrary length cyclical redundancy check, or CRC (e.g., up to 32 bits); secure digital input/output, or SDIO; serial general purpose input/output, or SGPIO; a digital correlator (e.g., having up to 32 bits with 4× over-sampling and supporting a configurable threshold); a Local Interconnect Network (LIN) bus interface; a delta-sigma modulator (e.g., for class D audio DAC having a differential output pair); an integrated inter-chip sound, or $I^2S$ (stereo); a liquid crystal display, or LCD, drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support); a capture timer (e.g., 16-bit or the like); a deadband PWM (e.g., 16-bit or the like); a system management bus, or SMbus (including formatting of SMbus packets with CRC in software); a brushless motor drive (e.g., to support 6/12 step commutation); auto BAUD rate detector and generator (e.g., automatically determine BAUD rate for standard rates from 1200 to 115200 BAUD and after detection to generate required clock to generate BAUD rate); and any other suitable type of digital function or combination of digital functions which can be implemented in multiple UDBs.

Programmable analog array 534 may include an array of analog components, where analog interconnect 544 provides routable connectivity between the analog components and IO pins 550. Programmable analog array 534 may include analog components including, but not limited to, comparators, mixers, programmable gain amplifiers (PGAs), transimpedance amplifiers (TIAs), analog-to-digital converters (ADCs), digital-to-analog converters (DACs), voltage references, current sources, sample and hold circuits, interconnects (and switches thereof), and any other suitable type of analog components and resources. Programmable analog array 534 may support various analog functions including, but not limited to, analog routing, LCD drive IO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function. Analog interconnect 544 includes a series of buses, switches and multiplexers that are interwoven amongst the analog components, which allows analog blocks, banks of blocks, and channels to be connected to each other, to internal and external reference signals, to mixed-signal blocks (e.g., such as DACs), as well as to IO pins 550.

One or more SMIF blocks, such as SMIF block 530, may be configured as an external memory controller that is coupled (e.g., though HSIO matrix 540 and IO pins 550) to one or more external memory devices (not shown in FIG. 5) over a serial interface (e.g., such as SPI). According to the encryption/decryption techniques described herein, when configured as an external memory controller, a SMIF block 530 may be configured to receive (e.g., from internal bus 522) a read operation to fetch a block of data from an external memory device to which the block is coupled. After receiving the read operation, SMIF block 530 is configured to use a secret key to encrypt an address for the read operation to obtain an encrypted address, concurrently with sending the read operation instruction to the external memory device and with receiving an encrypted copy of the requested block of data in response thereto. After receiving the encrypted copy of the block of data, SMIF block 530 is configured to decrypt the encrypted copy of the block of data, based on the encrypted address, to obtain the block of data itself and to send it (e.g., onto internal bus 522) as the response to the read operation. The same (and/or another) SMIF block 530 may be configured to support encryption of data blocks that are sent for storing on the external memory device. For example, according to the encryption/decryption techniques described herein, SMIF block 530 may be configured to receive (e.g., from internal bus 522) a write operation to write a block of data to the external memory device to which the block is coupled. After receiving the write operation, SMIF block 530 is configured to encrypt with the secret key an address for the write operation to obtain an encrypted address, concurrently with preparing and sending the write operation instruction to the external memory device. After generating the encrypted address, SMIF block 530 is configured to encrypt the block of data, based on the encrypted address, to obtain an encrypted copy of the block of data. SMIF 530 then stores (or causes the storage of) the encrypted copy of the block of data in the external memory device.

In some embodiments, special functions array 536 may include dedicated (e.g., non-programmable) fixed-function blocks and/or one or more interfaces to dedicated functional blocks, such as a universal serial bus (USB), a crystal oscillator drive, a joint test action group (JTAG) interface, and the like. Such fixed-function blocks may be implemented on-chip by using circuitry elements that include, but are not limited to, one or more counters (e.g., 8-bit, 16-bit, etc.), one or more capture registers, one or more period registers, one or more compare registers, one or more center-aligned PWM elements, one or more clock pre-scaling elements, one or more pseudo random PWM elements, and one or more quadrature decoding elements.

HSIO matrix 540 provides connectivity to IO pins 550 from various components of device 500. (In FIG. 5, for illustration purposes IO pins 550 are shown as a block at the bottom of device 500; in various form factors, however, the IO pins may be located on two or more of the sides of the chip package into which the device is packaged.) For example, HSIO matrix 540 may include a set of multiplexers and/or other components that couple the various blocks of SMIF 530 and special functions array 536 to IO pins 550.

In some embodiments, the encryption functionality of the techniques described herein translates plaintext data into ciphertext data (for write operations) and vice versa (for read operations). Unencrypted/plaintext data is used inside of the device performing the encryption, e.g., such as a microcontroller or a system-on-chip. Encrypted/ciphertext data is transferred over the serial memory interface to an external (e.g., off-chip) memory device. Access to the off-chip memory device may be provided in XIP mode and/or MMIO mode that may be included in the same control path.

In XIP mode, a block of addresses is mapped directly to locations in an external memory device (e.g., such as off-chip SRAM). When the CPU executes code that references addresses that point to locations on the external memory device, an external memory controller retrieves the data from the external memory device and places it on the internal bus. From an address point of view, the addresses for the external memory controller have a range of values. Within the address range, the external memory controller may have some blocks of addresses that are directly mapped to its registers (which in turn may map to locations on the external memory device) and some blocks of addresses that are mapped to the external memory device. Thus, when the CPU accesses an address within the XIP address range, the external memory controller stores the address in its address register, requests the data block specified by the address from the external memory device, retrieves the data block when it appears on the interface to the external memory device, and then sends this data block back to the CPU.

In MMIO mode, from the CPU perspective an address points to a register in the external memory controller, where the register may be mapped to some location on an external memory device (from the perspective of the controller). Thus, when the CPU executes code that references an MMIO address, the CPU fetches the data block stored in the register pointed to by the MMIO address, while the external memory controller ensures that the register has the correct data block at the time when the CPU needs it.

Figure 6:
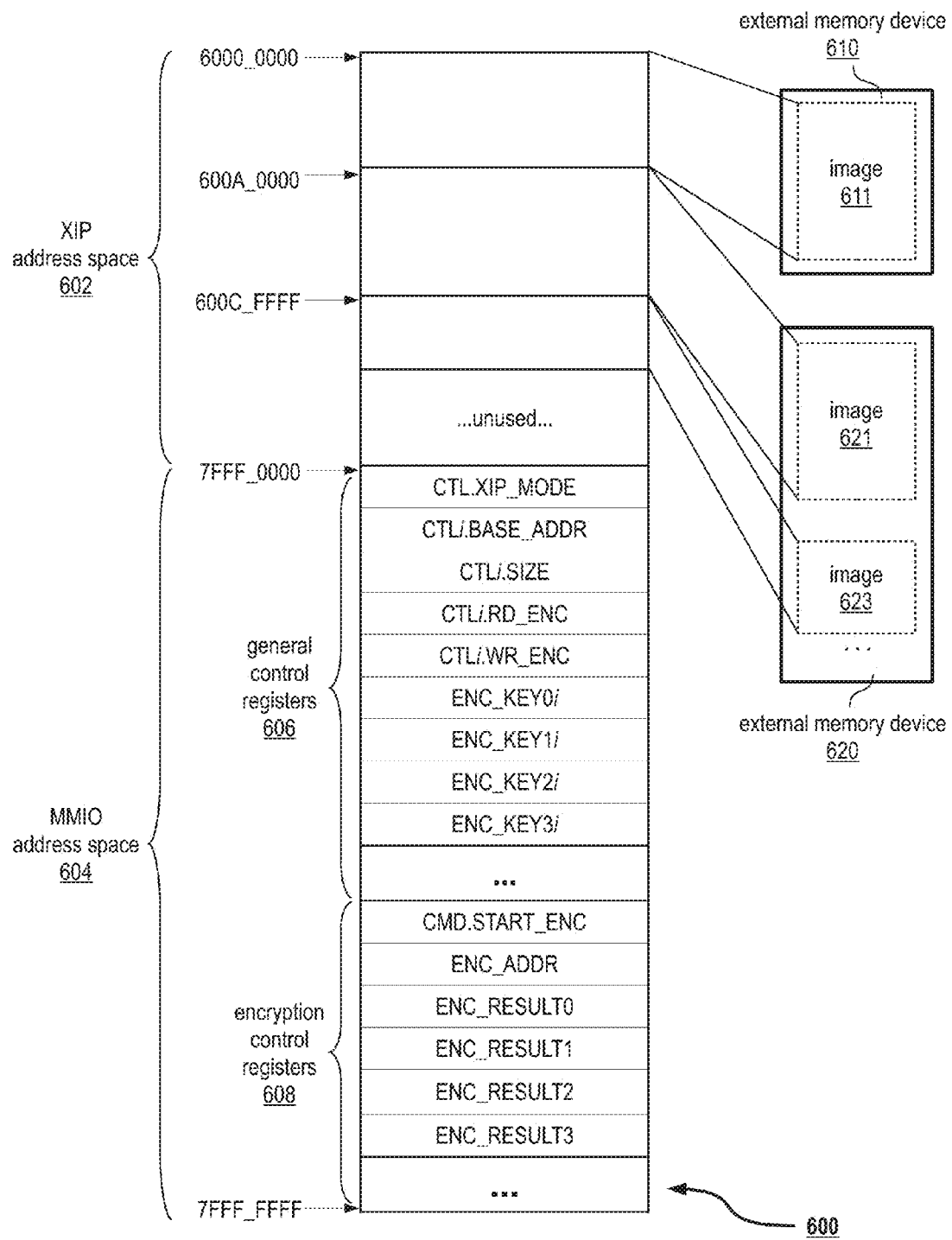
FIG. 6 is a block diagram illustrating an address space for multi-mode control path access to data and/or code in external memory device(s), according to an example embodiment.

FIG. 6 is a block diagram illustrating an example address space 600 for multi-mode control path access to data and/or code in external memory device(s). Address space 600 illustrates addresses that are mapped to external memory device 610 (which includes image 611) and external memory device 620 (which includes images 621 and 623). For example, address space 600 may be configured for a programmable system-on-chip device (e.g., such as device 500 in FIG. 5).

As illustrated in FIG. 6, address space 600 includes XIP address space 602 and MMIO address space 604. XIP address space 602 includes three memory address regions that respectively correspond to image 611 (in external memory device 610) and images 621 and 623 (in external memory device 620). XIP address space 602 may also include one or more unused memory address regions that are not mapped to images in the external memory devices—e.g., because the microcontroller may not be configured to access more extra memory or simply because the external memory devices are not completely full.

MMIO address space 604 includes general control registers 606 and encryption control registers 608 that are mapped directly to addresses accessible by the CPU in the microcontroller. General control registers 606 include registers that are used for controlling access to the various images that are mapped to the various memory address regions. For example, some general control registers (e.g., such as CTL.XIP_MODE) may be used to control the access to all regions, while other general control registers may be specific for each memory address region i—e.g., such as registers identifying the location of a particular region i (e.g., CTLi.BASE_ADDR, CTLi.SIZE), registers specifying the type (e.g., read/write) of access to a particular region i (e.g., CTLi.RD_ENC, CTLi.WR_ENC), and registers that store the secret key associated with a particular region i (e.g., ENC_KEY0i . . . ENC_KEY3i). Encryption control registers 608 include resisters that are used for controlling the encryption/decryption operations—e.g., such as registers used to start the encryption operation(s) (e.g., CMD.START_ENC), registers that store the address for a CPU instruction that is being processed (e.g., ENC_ADDR), and registers that store the result of an encryption operation on the secret key (e.g., such as ENC_RESULT0 . . . ENC_RESULT3).

It is noted that according to the techniques described herein, in some embodiments a single secret key may be associated with all memory regions for the external memory device(s). In other embodiments, however, each memory region may be associated with its own key, and in yet other embodiments each image within each memory region may be associated with its own different key; thus, in such other embodiments the techniques described herein provide for selecting (e.g., by an external memory controller) and/or loading the correct key prior to accessing the memory region or image corresponding to that key.

While FIG. 6 illustrates that the XIP address space 602 and the MMIO address space 604 have their own continuous address ranges, it is noted that in various embodiment these address spaces may be interleaved with each other. For example, the address range of an XIP address space for a particular memory region may include the addresses of one or more general and/or encryption control registers that are specific for that particular memory region. Alternatively, or in addition to, the address range of a MMIO address space may include one or more XIP addresses and/or one or more control registers associated therewith. Thus, address space 600 in FIG. 6 is to be considered in an illustrative rather than a restrictive sense.

According to some embodiments of the encryption/decryption techniques described herein, in XIP mode encryption is performed "on-the-fly" on read and/or write accesses to the external memory device(s). Encryption can be enabled for each memory region i separately, for example:
- a register associated specifically with the region, CTLi.RD_ENC, may specify if encryption is performed for read accesses;
- a register associated specifically with the region, CTLi.WR_ENC, may specify if encryption is performed for write accesses.

In MMIO mode, encryption is supported through a MMIO register interface. In this mode, a single encryption sequence according to the techniques described herein may include the following steps:
1. the secret key, KEY, and plaintext address, PA, are written to MMIO registers;
2. the encryption operation according to the techniques described herein (e.g., encryption of the plaintext address followed by decryption of the data block corresponding to the address) is started;
3. when the encryption operation is completed, the decrypted data block is read from MMIO registers.

Figure 7:
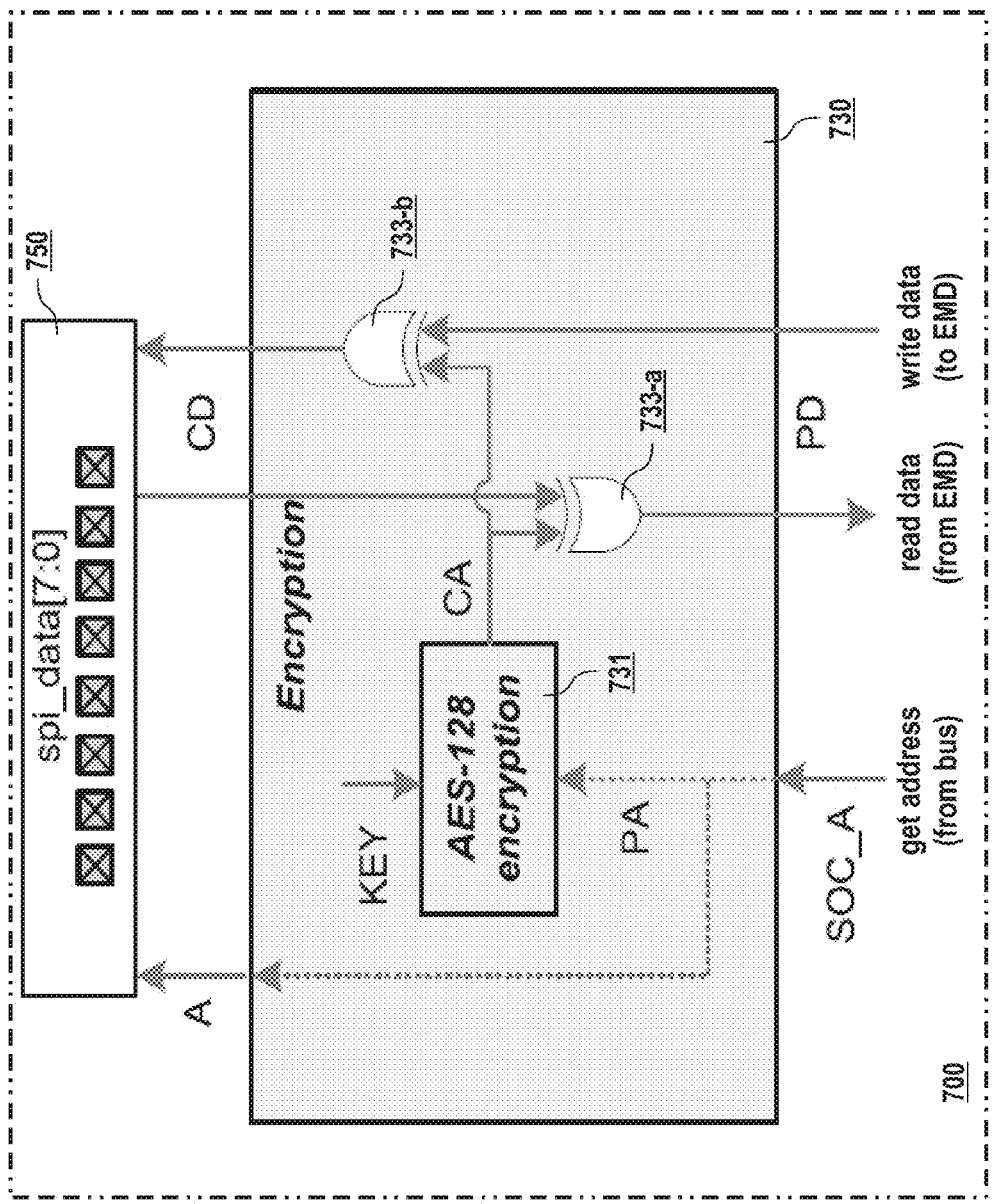
FIG. 7 is a block diagram illustrating an encryption/decryption block and the operation thereof according to an example embodiment.

FIG. 7 is a block diagram illustrating a device 700 that includes an encryption/decryption block configured to operate according to the techniques described herein. In some embodiments, device 700 may be a programmable system-on-chip (e.g., such as device 500 in FIG. 5) that uses a suitable address space (e.g., such as address space 600 in FIG. 6) to access external memory devices.

As illustrated in FIG. 7, among other components (not shown) device 700 includes encryption/decryption block 730 and external memory interface 750. Encryption/decryption block 730 is coupled to interface 750 over one or more internal interconnects and/or buses (not shown), while the pins of interface 750 are configured for coupling to one or more external memory devices (not shown) over PCB tracks/pads, trace lines, or equivalents. In the embodiment illustrated in FIG. 7, interface 750 is an 8-pin SPI interface. Within device 700, encryption/decryption block 730 may be implemented in various ways. For example, in some embodiments the encryption/decryption block may be implemented as a dedicated, fixed-function hardware block (e.g., with logic gates, LUTs, PLDs, muxes, etc.) that is fabricated on the same die as the device. In other embodiments, the encryption/decryption block may be implemented as a fixed or programmable hardware block (e.g., with logic gates, LUTs, PLDs, muxes, etc.) within an external memory controller that is on the same die or in the same chip module as the device.

According to the techniques described herein, encryption/decryption block 700 includes strong encryption block logic 731 that is coupled to weak encryption blocks 733-a and 733-b. Block logic 731 is configured with, or has access to, a secret key. Further, block logic 731 is configured to receive an unencrypted address for an access (e.g., read or write) operation to an external memory device, and to use the secret key in a strong encryption algorithm to encrypt the address into an encrypted address. For example, as illustrated in FIG. 7, block logic 731 receives/retrieves a secret key, KEY, and also receives an operation address, SOC_A, for an access (e.g., read or write) operation from an internal bus (not shown). Block logic 731 then derives an external memory address, A, from the operation address and passes it to the external memory device over interface 750. Block 731 also processes the received address, SOC_A, to obtain a plaintext address, PA. Block logic 731 applies the strong encryption algorithm (e.g., AES-128) on the secret key, KEY, to obtain a cyphertext address, CA, which is then passed to block logic 733-a (for read operations) or to block logic 733-b (for write operations).

Block logic 733-a is configured for use in read operations. In a read operation, block logic 733-a is configured to receive an encrypted address for the read operation from block logic 731, to receive an encrypted data block for the read operation from an external memory device (EMD), and to apply a weak (but fast) encryption function to the encrypted address and the encrypted data block to obtain a decrypted copy of the data block, which is then returned in response to the read operation. For example, as illustrated in FIG. 7, block logic 733-a receives a ciphertext address, CA, for a read operation from block logic 731 and a ciphertext data block, CD, for the read operation from the external memory device over interface 750. Block logic 733-a then applies a weak encryption function (e.g., XOR) on the ciphertext address and the ciphertext data block to obtain a plaintext copy of the data block, PD, which is then passed over an internal bus (not shown) as the response to the read operation.

Block logic 733-b is configured for use in write operations. In a write operation, block logic 733-b is configured to receive an encrypted address for the write operation from block logic 731, to receive an unencrypted data block for the write operation from an internal bus (not shown), and to apply a weak (but fast) encryption function to the encrypted address and the unencrypted data block to obtain an encrypted copy of the data block, which is then sent to an external memory device (EMD) for storage. For example, as illustrated in FIG. 7, block logic 733-b receives a ciphertext address, CA, for a write operation from block logic 731 and a plaintext data block, PD, for the write operation from an internal bus (not shown). Block logic 733-b then applies a weak encryption function (e.g., XOR) on the ciphertext address and the plaintext data block to obtain a ciphertext copy of the data block, CD, which is then send for storage to the external memory device over interface 750.

Some embodiments of the techniques described herein may be implemented by hardware (HW) blocks (e.g., such as block 730 in FIG. 7) for devices (e.g., such as device 500 in FIG. 5) that use 32-bit address spaces (e.g., such as address space 600 in FIG. 6). In such embodiments, a strong (but relatively slow) encryption algorithm (e.g., AES-128) is performed on the addresses of access operations and a weak (but relatively fast) encryption function (e.g., XOR) is performed for encryption/decryption of the data blocks of the access operations. For example, the AES-128 encryption functionality may take multiple clock cycles, while an XOR functionality does not add any cycle delay to the latency of the access operations.

In one such example embodiment that uses 32-bit device addresses and AES-128 encryption, in XIP mode an external memory address, A[ ], is constructed from the 32-bit access operation address, SOC_A[31:0]. This process may depend on:

the size of the XIP memory space, e.g., $2^n$ bytes, with n in the range [16, 28];

the size of the external memory region, e.g., $2^m$ bytes, with m in the range [8, n], where the external memory region may be a subset of the external memory address space.

The following formula may be used to derive the external memory address, A[ ], from the access operation address, SOC_A[31:0]:

A[m−1:0]=SOC_A[m−1:0].

In the above formula, the lower m−1 bits from the 32-bit operation address are used for the external memory address, A[ ], but it is noted that in different embodiments different techniques may be used (e.g., depending on how big the region of memory is). It is also noted that in the above formula, the external memory address, A[ ], specifies one or more bytes within the external memory and the base location of the XIP memory space in the 32-bit device address space, but the base location of the memory region in the XIP memory space is lost in the derivation.

In addition to the external memory address, A[ ], a plaintext address, PA[127:0], is constructed. The plaintext address PA[127:0] is the input to the AES-128 encryption block, and a ciphertext address, CA[127:0], is the output of the AES-128 encryption block. The following formulas may be used to derive the plaintext address, PA[ ], from the 32-bit access operation address, SOC_A[31:0]:

PA[127:0]=0
PA[n−1:4]=SOC_A[n−1:4].

In the above formulas, the first operation initializes the plaintext address, PA[127:0], and the second operation selects the range from the top n−1 bits to the lower 4 bits of the 32-bit access operation address. It is noted that the lower 4 bits of the plaintext address, PA[127:0], are always 0, and the upper n to 127 bits are also always 0. The former ensures that the plaintext address, PA[127:0], is always a multiple of 16 bytes, while the latter ensures that the plaintext address is padded with zeros to a 128-bit length (which is the required length of an AES-128 input). In this embodiment, every 16-byte group in the XIP memory space has a unique plaintext address, PA[127:0], because the external memory controller always fetches data 16 bytes at a time (e.g., a data block for a read operation is always 16 bytes in length). It is noted, however, that various embodiments may use various mechanisms to derive the plaintext address from the access operation address—e.g., depending on the length of the access operation address, the size of reads allowed by the external memory, the level of acceptable latency of the strong encryption as compared to the access operation latency, and the like.

In this embodiment, the AES-128 encryption block uses a 128-bit secret key, KEY[127:0]. The secret key, KEY[127:0], is provided by four read-only MMIO registers, ENC_KEY0, . . . , ENC_KEY3, and should be kept secret to ensure reliable protection against attacks. Based on the secret key, KEY[127:0], the AES-128 encryption block outputs the ciphertext address, CA[127:0], as follows:

CA[127:0]=AES-128 (KEY[127:0], PA[127:0]).

The ciphertext address, CA[127:0], is 16 bytes (128 bits) in size and is used for encryption and decryption of the data blocks for the access (e.g., read and write) operations. In this embodiment, every 16-byte group in the external memory has a unique ciphertext address, CA[127:0], whose size equals the size of the byte group. This allows for an XOR-based encryption/decryption that bitwise-combines the ciphertext address, CA[127:0], with the 16-byte data block for a read operation.

For a write operation having a plaintext data block, PD[127:0], with a ciphertext address, CA[127:0], the corresponding ciphertext data block, CD[127:0], is encrypted by using a hardware-implemented XOR function as follows:

CD[127:0]=CA[127:0] XOR PD[127:0]

As the XOR operation is symmetrical, for a read operation the ciphertext data block, CD[127:0], is decrypted by XORing it with the ciphertext address, CA[127:0], to obtain the plaintext data block, PD[127:0], as follows:

PD[127:0]=CA[127:0] XOR CD[127:0]

In this embodiment, for read operations the encrypted data blocks retrieved from the external memory act as the ciphertext data blocks that are decrypted into the operations' plaintext data blocks. For write operations, the operations' data acts as the plaintext data blocks that are encrypted and stored into the external memory as the corresponding ciphertext data blocks. It is noted that in some embodiments the external memory device may perform write operations in larger data chunks than the associated read operations. For example, a write operation for a given external memory may require writing of data chunks in address ranges of 512 bytes, while a read operation for the same external memory may require fetching the data in 16-byte data blocks. Thus, in this example the address range (e.g., 512 bytes) of a write operation may first be split into 32 16-byte plaintext addresses, which correspond to a group of 32 16-byte data blocks. Next, the cyphertext address for each 16-byte data block is determined from the 16-byte plaintext address of that data block, and then each data block is encrypted based on its ciphertext address to obtain the corresponding ciphertext data block. When all of the 16-byte data blocks in the group are processed in this manner, the corresponding ciphertext data blocks are used to assemble an encrypted copy of the group of 32 data blocks, which is then written (as a 512-byte chunk) to the external memory.

In this embodiment, in MMIO mode the encryption and decryption is not performed on-the-fly. Instead, a MMIO register interface is provided to the AES-128 encryption block. This interface allows the encryption (e.g., XOR-based) of plaintext data blocks into ciphertext data blocks to be implemented by executing software (SW) or firmware (FW) instructions. For example, this mechanism is useful when a flash memory device is programmed with new content. In this embodiment, the MMIO interface includes the following MMIO registers:

four registers, ENC_KEY0, . . . , ENC_KEY3, store (e.g., are written with) a 128-bit AES encryption key, and these registers are shared with the XIP mode for storing the key;

a register, ENC_ADDR, can be written with a plaintext address, PA[31:0], (with the upper 96 bits known/assumed to be always '0');

a resister field, CMD.START_ENC, starts the AES-128 encryption block to encrypt the plaintext address, PA[127:0], based on the secret key, KEY[127:0]; hardware instructions are used to set this field to '0' when the encryption is completed;

four registers, ENC_RESULT0, . . . . , ENC_RESULT3, store the result (i.e., ciphertext address, CA[127:0]) of the address encryption, and are read to get the ciphertext address after the encryption is completed; SW or FW instructions are executed to XOR-encrypt a 16-byte plaintext data block, PD[127:0], with the ciphertext address, CA[127:0].

It is noted that registers of the MMIO interface are located in the external memory controller, but the data blocks for the access operations in MMIO mode still reside on the external memory device. The difference between the MMIO mode and the XIP mode, however, is in the control path—for example, in XIP mode an operation/CPU address for a data block is an address in the controller's XIP address portion, while in MMIO mode an operation/CPU address for a data block is directly mapped to a controller's register (e.g., ENC_ADDR) and the controller registers are used to store the ciphertext address, CA[127:0]. Other than that, the data path (for storing/retrieving data blocks to/from the external memory device) is the same for both MMIO and XIP modes, such that in both modes the data blocks associated with operation addresses reside in the external memory device.

In this embodiment, when met the following requirements can ensure maximum protection of the encryption key, KEY[127:0], in XIP mode:
  the trusted SW block that sets the XIP encryption key should first set a register field, e.g., CTL.XIP_MODE, to '1' and then write the encryption key in ENC_KEY0, . . . , ENC_KEY3;
  a HW block should clear the encryption key in ENC_KEY0, . . . , ENC_KEY3 to '0' when the register field, CTL.XIP_MODE, is changed from '1' to '0' (e.g., when a transition from XIP mode to MMIO mode is effected); this effectively ensures that an encryption key would not be shared between the XIP mode and the MMIO mode;
  a HW block should provide write-only access to the encryption key in ENC_KEY0, . . . , ENC_KEY3;
  the MMIO interface (though register field CMD.ENC_START) should only be available when the register field, CTL.XIP_MODE, is '0' (MMIO mode); when the register field, CTL.XIP_MODE, is (XIP mode), then a read by a SW block from ENC_RESULT0, . . . , ENC_RESULT3 should return '0'.

In term of performance, the techniques described herein rely on AES-like strong encryption algorithms for address encryption and XOR-like functionality for data encryption and decryption. This is intentional, since additional delay in the data path degrades the access latency of the read/write operations to the external memory. By performing the complex, longer latency AES-like encryption algorithms on the address, rather than the data, any additional delay can be kept to a minimum or even be prevented entirely.

Figure 8:
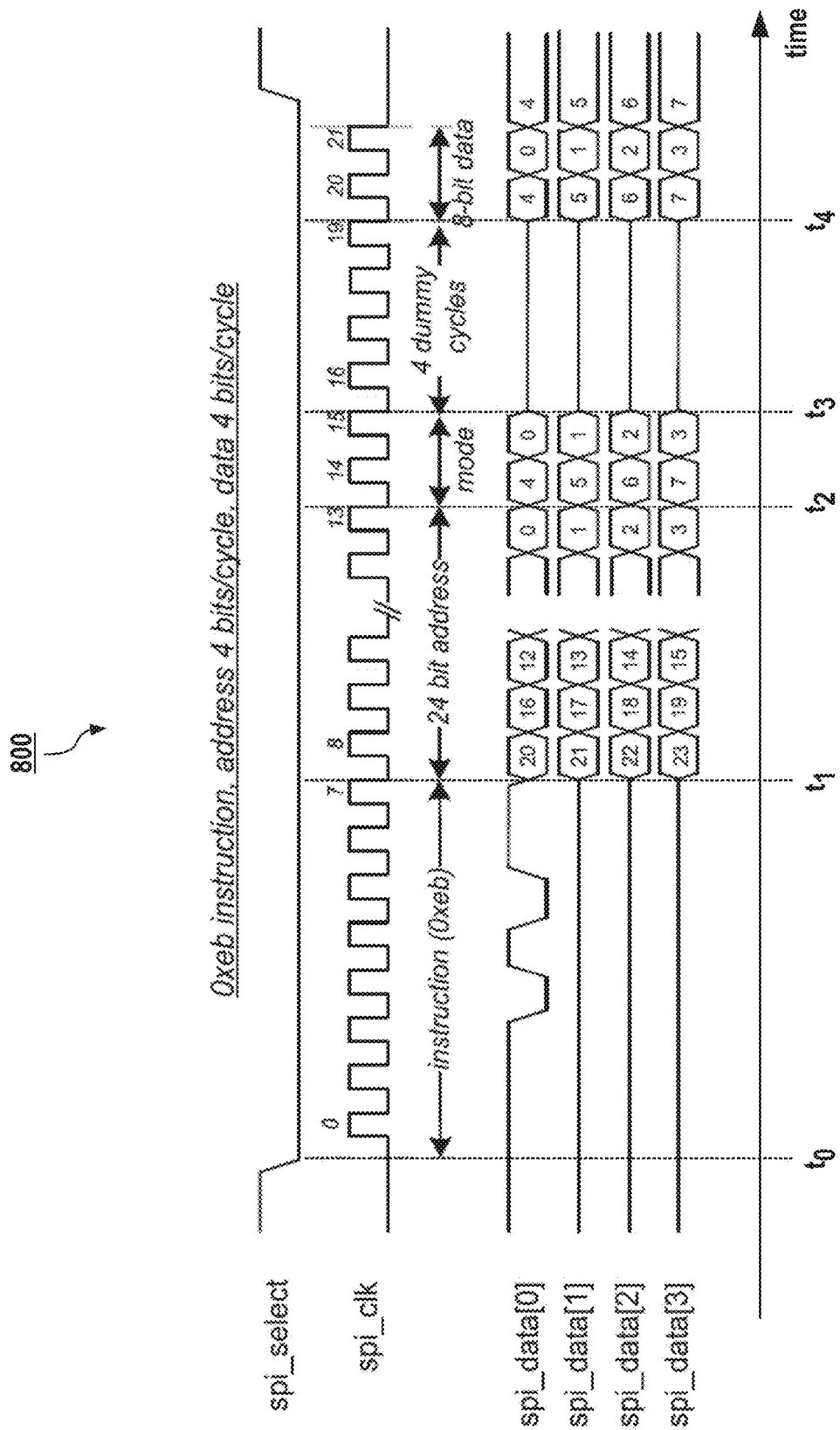
FIG. 8 is a timing diagram illustrating a read operation from an external memory device according to an example embodiment.

The following example illustrates this with respect to a programmable system-on-chip device, such as device 500 in FIG. 5. Referring to FIG. 5, suppose that an AHB-Lite operation misses in the data cache (e.g., SRAM 512) of CPU 502 in microcontroller 500. This results in CPU 502 placing a SPI read operation on internal bus 522 to the external memory controller (e.g., SMIF 530). As executed by controller 530, a SPI-based operation to read a data block from an external memory device includes several phases. In the first phases, the read instruction and its address are transmitted to the external memory device. In the last phase the requested data block is received from the external memory device. These phases are illustrated in FIG. 8. Per timing diagram 800, prior to time $t_0$ the controller 530 has received both the read instruction (0xeb) and its 24-bit address from CPU 502 over the internal bus 522. Then, at time $t_0$ the controller 530 initializes the SPI interface to the external memory device, and commences the transfer of the read instruction (0xeb). It takes 8 clock cycles to complete the transfer of the read instruction over the SPI interface, at time $t_1$. Then, at time $t_1$ the controller 530 commences the transfer of the 24-bit instruction address, and it takes 6 clock cycles to complete the transfer of the address over the SPI interface, at time $t_2$. Then, at time $t_2$ the controller 530 commences the transfer of the mode of the read operation, and it takes 2 clock cycles to complete its transfer over the SPI interface, at time $t_3$. Then, at time $t_3$ the controller 530 waits for 4 (dummy) clock cycles until time $t_4$, at which time the requested data starts coming back from the external memory device over the SPI interface. Thus, it takes 20 clock cycles until the controller 530 starts receiving the data block requested by the read operation. So it is concurrently (and in parallel, if the strong encryption takes exactly 20 clock cycles) with these 20 clock cycles that the controller 530 encrypts the address for the read operation with the strong (e.g., AES-128) encryption algorithm, in so that at time $t_4$ the controller 530 can perform an XOR operation on the encrypted address in a streaming fashion as the bits of data are being continuously received over the SPI interface. The example SPI transfer in FIG. 8 illustrates that if the time it takes to encrypt a plaintext address, PA[ ], into a ciphertext address, CA[ ] (used for decrypting the data), is less than the time to bring in the first data element from the external memory device, then the encryption does not add delay. However, it is noted that if a strong (e.g., AES-like) algorithm were used to decrypt the incoming ciphertext data block, then such strong decryption algorithm would have added delay!

In general, in various embodiments the techniques described herein provide for using two encryption/decryption mechanisms:
  an AES-like algorithm to implement a strong encryption that takes multiple clock cycles;
  an XOR-like function to implement a weak encryption/decryption that does not add clock cycles.

By using an "AES-strong", unique XOR pattern (e.g., CA[127:0]) for each data block of an access (e.g., read or write operation), the weakness of the XOR-like function is overcome and the data flow does not incur additional delay cycles.

Figure 9:
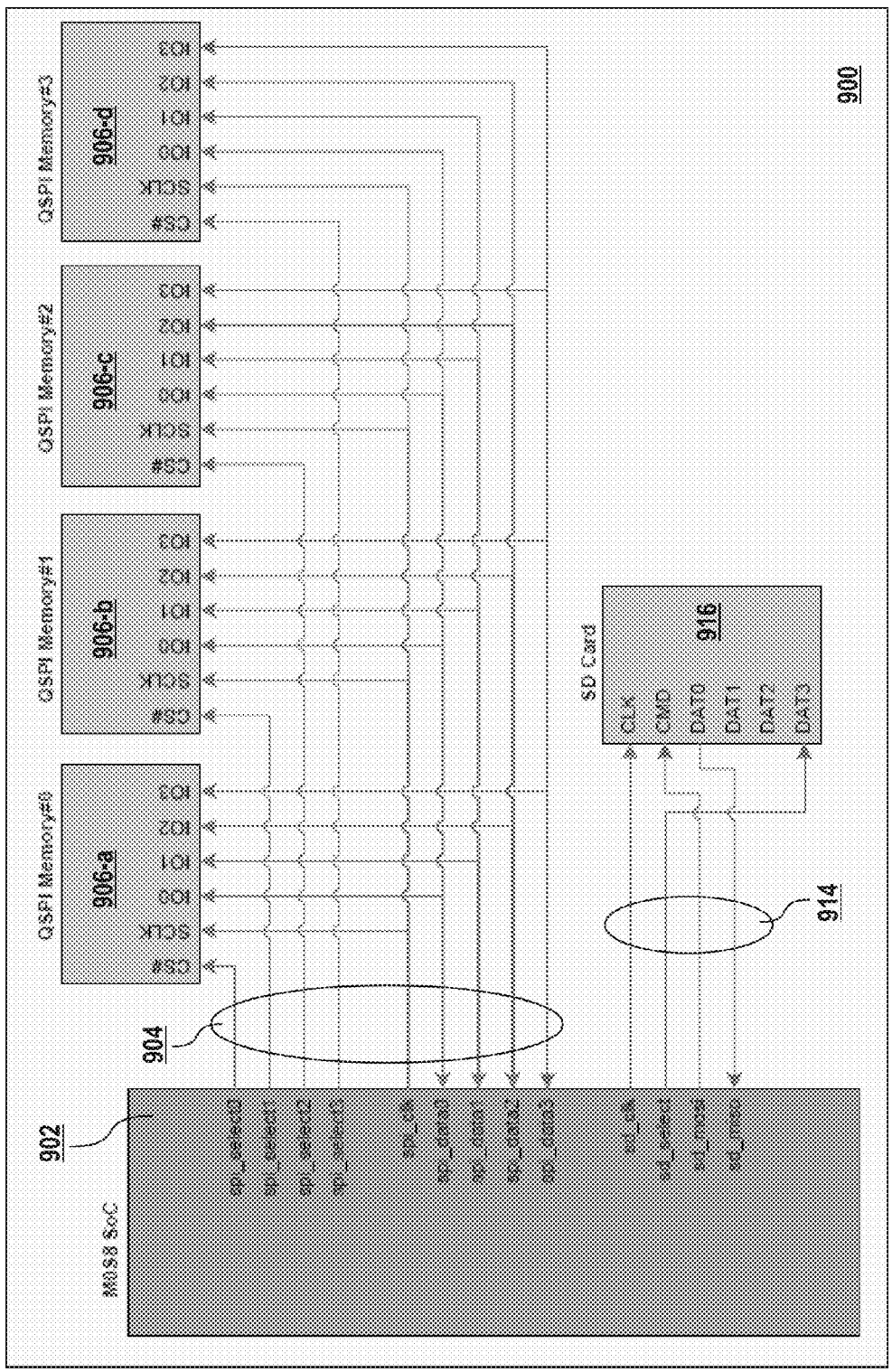
FIG. 9 is a block diagram illustrating a system according to an example embodiment.

FIG. 9 is a block diagram illustrating a system that implements an example embodiment of the encryption/decryption techniques described herein. Among other components (not shown in FIG. 9), system 900 includes microcontroller 902 that is coupled to four external memory devices (906-a, 906-b, 906c, 906-d) and an SD card 916, all of which are external (e.g., off-chip) to the chip or chip-module that houses the microcontroller. For example, microcontroller 902, external memory devices 906-a to 906-d, and SD card 916 may be disposed on the same PCB board, or equivalent structure, and may be coupled to each other over PCB tracks/pads, trace lines, and/or any other types of equivalent signal-conducting means.

As illustrated in FIG. 9, microcontroller 902 and external memory devices 906-a to 906-d are coupled over a QSPI serial peripheral interface 904. QSPI interface 904 has four channels, each coupled to one of external memory devices 906-a, 906-b, 906c, and 906-d. Each of external memory devices 906-a, 906-b, 906c, and 906-d is an off-chip memory that augments the internal SRAM memory of microcontroller 902. In various embodiments and implementations, each (or all) of the external memory devices 906-*a*, 906-*b*, 906*c*, and 906-*d* may be any one of an off-chip NOR flash memory module, an off-chip SRAM module, an off-chip nvSRAM module, and an off-chip NAND flash memory. SD card 916 (which may be removable) is coupled to microcontroller 902 over a SD-SPI serial interface 914.

In operation according to the techniques described herein, microcontroller 900 (or an external memory controller therein) is configured to perform on-the-fly encryption and decryption, based on a secret key, for read and write operations that access data in external devices 906-*a*, 906-*b*, 906*c*, 906-*d*, and SD card 916. For example, for a read operation to a target external device (e.g., one of memory devices 906-*a*, 906-*b*, 906*c*, 906-*d*, and SD card 916), microcontroller 900 is configured to encrypt an address for the read operation into an encrypted address, and then to decrypt a data block returned from the target external device based on the encrypted address. In another example, for a write operation to a target external device (e.g., one of memory devices 906-*a*, 906-*b*, 906*c*, 906-*d*, and SD card 916), microcontroller 900 is configured to encrypt an address for the write operation into an encrypted address, to encrypt a data block of the write operation based on the encrypted address, and to store the encrypted data block in the target external device.

Various embodiments of the encryption/decryption techniques described herein may include various operations. These operations may be performed by hardware, firmware, or combination(s) thereof. As used herein, the term "coupled to" means connected directly, or connected indirectly through one or more intervening components over PCB tracks/pads, switches, buses, hubs, trace lines, and/or programmable interconnects, as the case may be. Any of the signals provided through various PCB tracks/pads, switches, hubs, traces, and programmable interconnects may be time multiplexed with other signals and provided over one or more common or dedicated buses and/or signal traces. Each of the buses may alternatively include one or more single signal traces, and one or more signal traces may alternatively perform the function of a bus.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A device comprising:
an internal memory configured to store a key; and
a controller configured to communicate with an external memory device over a serial interface, wherein the controller is configured at least to:
transfer, to the external memory device, an address for an access operation to the external memory device over the serial interface;
encrypt, with the key, the address for the access operation to obtain an encrypted address concurrently with transferring the address to the external memory device over the serial interface; and
encrypt or decrypt a block of data for the access operation with the encrypted address.

2. The device of claim 1, wherein the access operation is a read operation and the controller is configured to encrypt the address for the read operation during multiple clock cycles after the controller receives the read operation and before the controller receives the block of data from the external memory device.

3. The device of claim 2, wherein the controller is configured to decrypt the block of data without using any clock cycles in addition to the multiple clock cycles.

4. The device of claim 1, wherein the access operation is a write operation and the controller is configured to encrypt the address for the write operation during multiple clock cycles after the controller receives the write operation and before the controller transfers the block of data to the external memory device.

5. The device of claim 4, wherein the controller is configured to encrypt the block of data without using any clock cycles in addition to the multiple clock cycles.

6. The device of claim 1, wherein the controller is configured to encrypt the address for the access operation and to encrypt or decrypt the block of data without increasing the latency of the access operation.

7. A system comprising:
an external memory device that stores an image encrypted with a key; and
a controller coupled to the external memory device over a serial interface, the controller configured at least to:
transfer, to the external memory device, an address for a read operation to the external memory device over the serial interface;
encrypt, with the key, the address for the read operation to obtain an encrypted address, the address specifying a block of data in the image, wherein the address is encrypted with the key concurrently with transferring the address to the external memory device over the serial interface;
receive an encrypted copy of the block of data from the external memory device;
decrypt the encrypted copy of the block of data with the encrypted address.

8. The system of claim 7, wherein the controller is configured to receive and store the key in internal memory when the system is activated.

9. The system of claim 7, wherein the controller is coupled to multiple external memory devices.

10. A method comprising:
receiving, by a controller, a read operation for a block of data from a memory device, wherein the memory device is coupled to the controller over a serial interface;
transferring, by the controller to the memory device, an address for the read operation to the memory device over the serial interface;
encrypting, by the controller with a key, the address for the read operation to obtain an encrypted address concurrently with transferring the address for the read operation to the memory device over the serial interface;
receiving, by the controller, an encrypted copy of the block of data from the memory device;
decrypting, by the controller, the encrypted copy of the block of data with the encrypted address, to obtain the block of data.

11. The method of claim 10, wherein the memory device is an external memory device and the method further comprises the controller returning the block of data in response to the read operation.

12. The method of claim 10, further comprising:
prior to receiving the read operation, the controller receiving a write operation to write the block of data to the memory device;
transferring, by the controller to the memory device, an address for the write operation to the memory device over the serial interface;
encrypting, by the controller, the address for the write operation with the key, to obtain the encrypted address concurrently with transferring the address for the write operation to the memory device over the serial interface;
encrypting, by the controller, the block of data with the encrypted address, to obtain the encrypted copy of the block of data; and
storing, by the controller, the encrypted copy of the block of data in the memory device.

13. The method of claim 10, wherein the address for the read operation is encrypted with an encryption algorithm having a latency that is less than or equal to a latency of a transfer operation, by the controller, that transfers the block of data from the memory device.

* * * * *